US012614758B2

(12) United States Patent
Sharratt et al.

(10) Patent No.: US 12,614,758 B2
(45) Date of Patent: Apr. 28, 2026

(54) COMPOSITION

(71) Applicant: Mexichem Fluor S.A. de C.V., San Luis Potosi (MX)

(72) Inventors: Andrew Sharratt, Runcorn (GB); Miodrag Oljaca, Concord, MA (US)

(73) Assignee: MEXICHEM FLUOR S.A. DE. C.V., San Luis Potosi (MX)

(*) Notice: Subject to any disclaimer, the term of this patent is extended or adjusted under 35 U.S.C. 154(b) by 523 days.

(21) Appl. No.: 18/256,264

(22) PCT Filed: Dec. 9, 2021

(86) PCT No.: PCT/GB2021/053228
§ 371 (c)(1),
(2) Date: Jun. 7, 2023

(87) PCT Pub. No.: WO2022/123255
PCT Pub. Date: Jun. 16, 2022

(65) Prior Publication Data

US 2024/0039048 A1 Feb. 1, 2024

Related U.S. Application Data

(60) Provisional application No. 63/124,407, filed on Dec. 11, 2020.

(30) Foreign Application Priority Data

Feb. 17, 2021 (GB) ..................................... 2102205

(51) Int. Cl.
*H01M 10/0568* (2010.01)
*H01M 10/0525* (2010.01)
(Continued)

(52) U.S. Cl.
CPC ... *H01M 10/0568* (2013.01); *H01M 10/0525* (2013.01); *H01M 10/0567* (2013.01); *H01M 10/0569* (2013.01)

(58) Field of Classification Search
CPC ......... H01M 10/0567; H01M 10/0568; H01M 10/0569
See application file for complete search history.

(56) References Cited

U.S. PATENT DOCUMENTS 5,750,730 A 5/1998 Nakano et al.
2011/0076572 A1* 3/2011 Amine ................. H01M 10/05 429/328
(Continued)

FOREIGN PATENT DOCUMENTS

CN 105111353 A 12/2015
CN 108780918 A 11/2018
(Continued)

OTHER PUBLICATIONS

International Search Report for corresponding International Application No. PCT/GB2021/053228 mailed Mar. 18, 2022, 4 pgs.
(Continued)

*Primary Examiner* — Christopher P Domone
(74) *Attorney, Agent, or Firm* — Crowell & Moring LLP; Yuezhong Feng

(57) ABSTRACT

Use of a composition comprises a compound of Formula 1 and a compound of Formula 2 in a nonaqueous battery electrolyte formulation wherein R is a fluorinated alkyl group and X is selected from the group consisting of F, Cl, H, $CF_3$, and $C_1$ to $C_6$ alkyl which may be at least partially fluorinated and the group OR can be cis- or trans- to any other group: wherein R and R' are H, F, Cl, $CF_3$, alkyl or fluoroalkyl.

28 Claims, 16 Drawing Sheets

Base electrolyte: 1M LiTFSI in DME : DOL (1:1 wt.%)

(51) Int. Cl.

| | |
|---|---|
| ***H01M 10/0567*** | (2010.01) |
| ***H01M 10/0569*** | (2010.01) |

(56) References Cited

U.S. PATENT DOCUMENTS

| | | | | |
|---|---|---|---|---|
| 2014/0342249 | A1* | 11/2014 | He .................... | H01M 10/4235 429/188 |
| 2015/0132663 | A1* | 5/2015 | Noguchi ............... | H01M 4/505 429/329 |
| 2019/0006700 | A1 | 1/2019 | Makino et al. | |
| 2019/0089003 | A1 | 3/2019 | Noguchi et al. | |
| 2019/0312269 | A1 | 10/2019 | Treger et al. | |

FOREIGN PATENT DOCUMENTS

| | | | |
|---|---|---|---|
| CN | 110168781 | A | 8/2019 |
| EP | 2 693 455 | A1 | 2/2014 |
| EP | 2 693 558 | A1 | 2/2014 |
| JP | S6215771 | A | 1/1987 |
| JP | H0837024 | A | 2/1996 |
| JP | 3807459 | B2 | 8/2006 |
| JP | 2009-508304 | A | 2/2009 |
| JP | 2010-146740 | A | 7/2010 |
| JP | 2011-040311 | A | 2/2011 |
| JP | 2012-074135 | A | 4/2012 |
| JP | 2014-072102 | A | 4/2014 |
| JP | 2015153525 | A | 8/2015 |
| KR | 2018-0057301 | A | 5/2018 |
| WO | WO 2010/147105 | A1 | 12/2010 |
| WO | WO 2011/001985 | A1 | 1/2011 |
| WO | WO 2013/129428 | A1 | 9/2013 |
| WO | WO 2015/160334 | A1 | 10/2015 |

OTHER PUBLICATIONS

Written Opinion of the International Searching Authority for corresponding International Application No. PCT/GB2021/053228 mailed Mar. 18, 2022, 8 pgs.

Japanese-language Office Action issued in Japanese Application No. 2023-535472 dated Jul. 30, 2025 with partial English translation (12 pages).

Chinese-language Office Action issued in Taiwanese Application No. 110146387 dated Sep. 3, 2025 with partial English translation (12 pages).

Machine Translation—Stepanova, V. B. Lebedev, et al., Regioselectivity in the Reactions of Adding Some Binucleophilic Reagents to Trifluoromethylacetylene, 1988, pp. 1-13, Journal of organic chemistry max XXIV, n.

* cited by examiner

Control electrolyte: 1M LiTFSI in Mexi-1 : DOL (1:1 wt.%)

COMPOSITION

RELATED APPLICATIONS

This application is a U.S. National Phase entry under 35 U.S.C. § 371 of International Application No. PCT/GB2021/053228, filed 9 Dec. 2021, which claims the benefit of U.S. Provisional Patent Application No. 63/124,407, filed 11 Dec. 2020, and claims priority to Great Britain Patent Application No. 2102205.8, filed 17 Feb. 2021, the contents of which are incorporated herein by reference in its entireties.

The present disclosure relates to nonaqueous electrolytic solutions for energy storage devices including batteries and capacitors, especially for secondary batteries and devices known as supercapacitors.

There are two main types of batteries: primary and secondary. Primary batteries are also known as non-rechargeable batteries. Secondary batteries are also known as rechargeable batteries. A well-known type of rechargeable battery is the lithium-ion battery. Lithium-ion batteries have a high energy density, no memory effect and low self-discharge.

Lithium-ion batteries are commonly used for portable electronics and electric vehicles. In the batteries lithium ions move from the negative electrode to the positive electrode during discharge and back when charging.

Typically, the electrolytic solutions include a nonaqueous solvent and an electrolyte salt, plus additives. The electrolyte is typically a mixture of organic carbonates such as ethylene carbonate, propylene carbonate, fluoroethylene carbonate, dialkyl carbonates such as ethyl methyl carbonate and ethers and polyethers such as dimethoxyethane or dioxolane containing a lithium-ion electrolyte salt. Many lithium salts can be used as the electrolyte salt; common examples include lithium hexafluorophosphate ($LiPF_6$), lithium bis (fluorosulfonyl) imide (LiFSI) and lithium bis (trifluoromethanesulfonyl)imide (LiTFSI).

The electrolytic solution has to perform a number of separate roles within the battery.

The principal role of the electrolyte is to facilitate the flow of charge carriers between the cathode and anode. This occurs by transportation of metal ions within the battery to or from one or both of the anode and cathode, whereby on chemical reduction or oxidation, electrical charge is liberated/adopted.

Thus, the electrolyte needs to provide a medium which is capable of solvating and/or supporting the metal ions.

Due to the use of lithium electrolyte salts and the interchange of lithium ions with lithium metal, which is very reactive with water, as well as the sensitivity of other battery components to water, the electrolyte is usually non-aqueous.

Additionally, the electrolyte has to have suitable rheological properties to permit/enhance the flow of ions therein, at the typical operating temperature to which a battery is exposed and is expected to perform.

Moreover, the electrolyte has to be as chemically inert as possible. This is particularly relevant in the context of the expected lifetime of the battery regarding internal corrosion within the battery (e.g. of the electrodes and casing) and the issue of battery leakage. Also of importance within the consideration of chemical stability is flammability. Unfortunately, typical electrolyte solvents can be a safety hazard, since they often comprise a flammable material.

This can be problematic as in operation, when discharging or being discharged, batteries may accumulate heat. This is especially true for high density batteries such as lithium-ion batteries. It is therefore desirable that the electrolyte displays a low flammability, with other related properties such as a high flash point.

It is also desirable that the electrolyte does not present an environmental issue with regard to disposability after use or other environmental issue such as global warming potential.

"Regioselectivity in addition reactions of some binucleophilic reagents to (trifluoromethyl) acetylene" Stepanova et. al., Zhurnal Organicheskoi Khimii (1988), 24(4), 692-9 describes the preparation of a dioxolane having a $CF_3CH_2$ group, at relatively low levels of selectivity.

The listing or discussion of an independently prior published document in this specification should not necessarily be taken as an acknowledgement that the document is part of the state of the art or is common general knowledge.

It is an object of the present invention to provide a nonaqueous electrolytic solution, which provides improved properties over the nonaqueous electrolytic solution of the prior art.

Use Aspects

According to a first aspect of the invention there is provided the use of a composition comprising a compound of Formula 1 and a compound of Formula 2 in a nonaqueous battery electrolyte formulation.

According to a second aspect of the invention there is provided the use of a nonaqueous battery electrolyte formulation composition comprising a compound of Formula 1 and a compound of Formula 2 in a battery.

Composition/Device Aspects

According to a third aspect of the invention there is provided a battery electrolyte formulation comprising a compound of Formula 1 and a compound of Formula 2.

According to a fourth aspect of the invention there is provided a formulation comprising a metal ion and a compound of Formula 1 and a compound of Formula 2, optionally in combination with a solvent.

According to a fifth aspect of the invention there is provided a battery comprising a battery electrolyte formulation comprising a compound of Formula 1 and a compound of Formula 2, optionally in combination with a solvent.

Method Aspects

According to a sixth aspect of the invention there is provided a method of reducing the flash point of a battery and/or a battery electrolyte formulation, comprising the addition of a formulation comprising a compound of Formula 1 and a compound of Formula 2.

According to a seventh aspect of the invention there is provided a method of powering an article comprising the use of a battery comprising a battery electrolyte formulation comprising a compound of Formula 1 and a compound of Formula 2.

According to an eighth aspect of the invention there is provided a method of retrofitting a battery electrolyte formulation comprising either (a) at least partial replacement of the battery electrolyte with a battery electrolyte formulation comprising a compound of Formula 1 and a compound of Formula 2, and/or (b) supplementation of the battery electrolyte with a battery electrolyte formulation comprising a compound of Formula 1 and a compound of Formula 2.

According to a ninth aspect of the invention there is provided a method of preparing a battery electrolyte formulation comprising mixing a compound of Formula 1 and a compound of Formula 2 with a lithium containing salt and other solvents or co-solvents.

According to a tenth aspect of the invention there is provided a method of preparing a battery electrolyte formulation comprising mixing a composition comprising a compound of Formula 1 and a compound of Formula 2 with a lithium-containing compound.

According to an eleventh aspect of the invention there is provided a method of improving battery capacity/charge transfer within a battery/battery life/etc. by the use of a composition comprising a compound of Formula 1 and a compound of Formula 2.

According to a twelfth aspect of the invention there is provided a method of reducing the overpotential generated at one or both of the electrodes of a battery during cycling by the use of a composition comprising a compound of Formula 1 and a compound of Formula 2.

Composition

In reference to all aspects of the invention the preferred composition comprises from 10 to 90 wt % of a compound of Formula (1) and 10 to 90 wt % of a compound of Formula (2). (This shall be taken to include the component of the composition made up by the compound of Formula (1) and the compound of Formula (2): any additional component (where present) is to be considered separately).

More preferably the composition comprises from 20 to 80 wt % of a compound of Formula (1) and 20 to 80 wt % of a compound of Formula (2); more preferably the composition comprises from 30 to 70 wt % of a compound of Formula (1) and 30 to 70 wt % of a compound of Formula (2); more preferably the composition comprises from 40 to 60 wt % of a compound of Formula (1) and 40 to 60 wt % of a compound of Formula (2). Most preferably the composition comprises about 50 wt % of a compound of Formula (1) and about 50 wt % of a compound of Formula (2).

Compound of Formula 1

In reference to all aspects of the invention the preferred embodiment of Formula (1) is below (1)

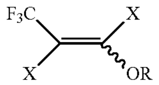

wherein

R is a fluorinated alkyl group and the stereochemistry of the —OR group can be either cis- or trans- to any other function and X is selected from the group consisting of F, Cl, H, $CF_3$, and $C_1$ to $C_6$ alkyl which may be at least partially fluorinated.

Alternatively, and also in reference to all aspects of the invention an alternate embodiment of Formula (1) is below (1)

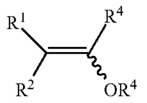

wherein $R^1$ is selected from the group consisting of F, Cl, H, $CF_3$, and $C_1$ to $C_6$ alkyl which may be at least partially fluorinated;

$R^2$ is selected from the group consisting of F, Cl, H, $CF_3$, and $C_1$ to $C_6$ alkyl which may be at least partially fluorinated;

$R^3$ is selected from the group consisting of F, Cl, H, $CF_3$, and $C_1$ to $C_6$ alkyl which may be at least partially fluorinated;

$R^4$ is selected from the group consisting of and $C_1$ to $C_{12}$ alkyl which may be at least partially fluorinated;

wherein at least one of $R^1$ to $R^4$ is or comprises F and the stereochemistry of the —$OR^4$ group can be cis- or trans- to any other function.

It is to be noted that the ninth aspect of the invention shall be taken to apply to both embodiments of the Formula (1).

Most preferably the compound of formula 1 is as below:—

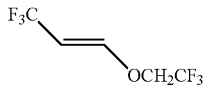

Compound of Formula 2

In reference to all aspects of the invention the preferred embodiment of Formula (2) is below:

(2)

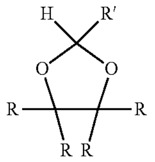

wherein R and R'═H, F, Cl, $CF_3$, alkyl or fluoroalkyl.

In a further preferred embodiment, at least one of the H groups can be replaced with $CF_3$ groups for example one, two or three H groups can be $CF_3$.

Preferably the compound of Formula 2 is prepared by a method that facilitates it recovery and purification to greater than 95%, for example greater than 99%.

Preferably compound of Formula 2 has the structure:

(2)

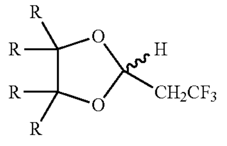

wherein R═H, F, $CF_3$, alkyl or fluoroalkyl.

In a preferred embodiment compound of Formula 2 is:

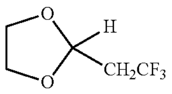

In a further preferred embodiment, at least one of the R groups can be $CF_3$. Conveniently, one, two, three or four R groups can be $CF_3$.

Preferably the compound of Formula 2 is prepared by a method that facilitates it recovery and purification to greater than 95%, for example greater than 99%.

"Regioselectivity in addition reactions of some binucleophilic reagents to (trifluoromethyl) acetylene" Stepanova et. al., Zhurnal Organicheskoi Khimii (1988), 24(4), 692-9 describes the preparation of a dioxolane of Formula 2 with all 4 Rs=H, as a minor by-product in the reaction of a compound of Formula $RNH_2$ with R=ethyl or phenyl and trifluoromethyl acetylene with base, with a solvent of ethylene glycol. The trifluoromethyl acetylene is condensed in the potassium hydroxide/methylene glycol solution at −70° C., which is then warmed to room temperature and thereafter to 80° C. for 5 hours. The reaction products are said to include the linear adduct 2-(3,3,3-trifluoro-1Z-propenyloxy) ethanol and the cyclic adduct 2-(2,2,2-trifluoroethyl)-1,3-dioxolane, at a ratio of 4:1.

Suitable dioxalanes can also be produced by the methods demonstrated in this application.

We have surprisingly found that a high yield of the cyclic adduct can be attained in this reaction if the trifluoromethyl acetylene (TFMA) component is maintained at a positive pressure in the reaction vessel.

Hence in a further aspect of the invention there is provided a method of manufacturing a compound of Formula 2 by reacting a glycol with trifluoromethyl acetylene at positive pressure under basic conditions.

Preferably, the reaction is carried out at 0° C. or above, conveniently at 20° C. or above, conveniently at a temperature of around 40° C. Preferably, the base is KOH.

Conveniently, the glycol is reacted with the TFMA for a period of at least one hour, preferably at least five hours and preferably at least 9 to 10 hours. Ideally the reaction time should be less than five days. We have found that a convenient reaction time is approximately 72 hours.

The pressure during the reaction is preferably at least 2 barg, preferably at least 4 barg, preferably at least 6 barg. We have found that a convenient pressure for the reaction is between 8 and 12 barg, preferably around 10 barg. In a preferred embodiment, the gas pressure is monitored and maintained during the reaction, if necessary topping-up the reaction vessel with TFMA during the reaction.

We have further surprisingly found that a high yield of the cyclic adduct can be attained if a diol or glycol is condensed with an aldehyde:

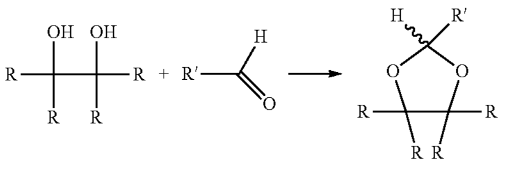

Hence in a further aspect of the invention there is provided a method of manufacturing a compound of Formula 2 by reacting a glycol or diol with an aldehyde.

Preferably, the diol or glycol is a compound of Formula 2a:

Formula 2a

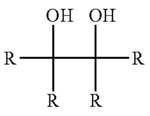

In the compound of formula 2a each R group can independently comprise of functional groups that include H, F, Cl, $CF_3$, alkyl, fluoroalkyl etc.

Preferably, the aldehyde is a compound of Formula 2b:

In the compound of Formula 2 and Formula 2b R' can comprise of functional groups that include F, Cl, $CF_3$, alkyl, fluoroalkyl etc. Conveniently R' is the same as R. In a preferred embodiment, R' is $CH_2CF_3$; also in a preferred embodiment, R is H and/or $CF_3$. Conveniently, R' is $CH_2CF_3$ and R is H and/or $CF_3$.

The table below includes some examples of preferred diols, aldehydes and the products of their condensation reactions:

| Diol | Aldehyde | Product |
|---|---|---|
| $HOCH_2CH_2OH$ | $CF_3CHO$ | 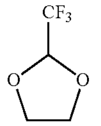 |
| $HOCH_2CH_2OH$ | $CF_3CH_2CHO$ | 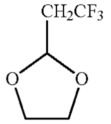 |
| $CF_3CHOHCH_2OH$ | $CF_3CHO$ | 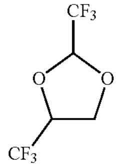 |
| $CF_3CH(OH)CH_2OH$ | $CF_3CH_2CHO$ | 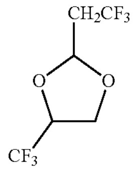 |
| $CF_3CH(OH)CH(OH)CF3$ | $CF_3CHO$ | 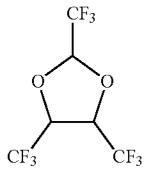 |
| $CF_3CH(OH)CH(OH)CF3$ | $CF_3CH_2CHO$ | 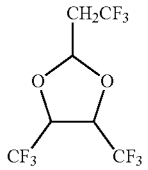 |

The products of these reactions includes, all stereoisomers some of which may possess different properties e.g. melting point, boiling point or electrochemical.

Conveniently, the glycol or diol is reacted with the aldehyde for a period of at least twelve hours, preferably at least twenty-four hours and preferably at least 48 hours. Ideally the reaction time should be less than five days. We have found that a convenient reaction time is approximately 48 hours.

The yield of the reaction can be improved by continuously removing the water by-product as it is formed. The reaction can be conducted at any suitable temperature and pressure such that the water by-product can be efficiently removed. Alternatively, the reaction can be conducted in the presence of an agent that removes the water as it is formed e.g. a molecular sieve or zeolite, sulphuric acid or thionyl chloride.

The diol and aldehyde can be present in equal amounts or an excess of one over the other can be used. A reaction solvent can be advantageously used to ensure good contacting between diol and aldehyde. An example of a suitable reaction solvent is dichloromethane.

A catalyst can be used to increase the rate of reaction and improve yields and selectivity. Preferably the catalyst is an acid, such as for example p-toluene sulphonic acid.

For use in battery electrolyte compositions, it is essential that preparative procedures are high yielding and selective such that it is possible to recover the compound of Formula 2 and purify it to greater than 95%, for example greater than 99%.

Thus, another objective of this application to improve on the known methods for preparing compounds of Formula 2, recovering them and purifying them to greater than 95%, for example greater than 99% purity. Compounds of Formula 2 can be conveniently prepared in high yield and selectively by reaction of TFMA with a glycol compound, preferably of Formula 2 and under basic conditions, with heating at pressure, where the pressure inside the reactor is maintained by repeatedly dosing it with TFMA:

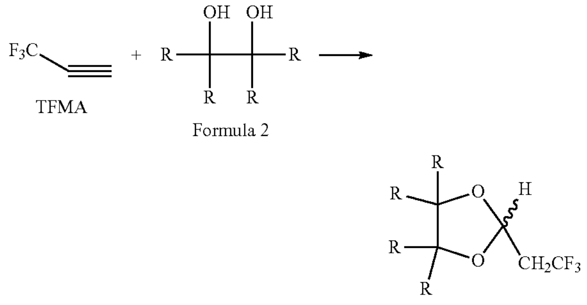

TFMA

Formula 2

Formula 1

In an embodiment, the alkyl or fluoroalkyl group may have a carbon chain length of $C_1$-$C_6$.

Preferably, by "alkyl" is meant $C_1$-$C_6$. By "fluoroalkyl" is meant an alkyl group that is partially- or fully-fluorinated.

In a preferred embodiment, at least one of the R groups can be $CF_3$. Conveniently, one, two, three or four R groups can be $CF_3$.

Compounds of Formula 2 can also be conveniently prepared in high yield and selectively by reaction of an aldehyde with a glycol compound, preferably of Formula 2a and under acidic and dehydrating conditions:

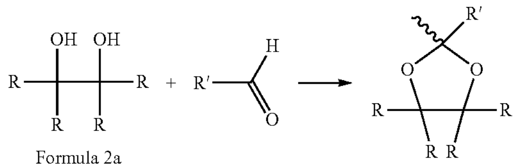

Formula 2a

In an embodiment, the alkyl or fluoroalkyl group may have a carbon chain length of $C_1$-$C_6$.

Preferably, by "alkyl" is meant $C_1$-$C_6$. By "fluoroalkyl" is meant an alkyl group that is partially- or fully-fluorinated.

In a preferred embodiment, at least one of the R groups can be $CF_3$. Conveniently, one, two, three or four R groups can be $CF_3$.

Advantages

In the aspects of the invention, the electrolyte formulation has been found to be surprisingly advantageous.

The advantages of using a composition comprising a compound of Formula 1 and a compound of Formula 2 in electrolyte solvent compositions manifest themselves in a number of ways. With the use of the composition a high energy density battery ca be provided. The presence of the composition can reduce the flammability of the electrolyte composition (such as when for example measured by flash-point). Indeed in this regard it has been found that the flammability can be reduced by increasing the flash point to around 50° C. The oxidative stability of the composition makes it suitable for batteries required to work in harsh conditions and at high temperatures, they are compatible with common electrode chemistries and can even enhance the performance of these electrodes through their interactions with them.

Additionally, electrolyte compositions comprising a compound of Formula 1 and a compound of Formula 2 may have superior physical properties including low viscosity and a low melting point, yet a high boiling point with the associated advantage of little or no gas generation in use. The electrolyte formulation may wet and spread extremely well over surfaces, particularly fluorine-containing surfaces; this is postulated to result from a beneficial a relationship between its adhesive and cohesive forces, to yield a low contact angle.

Furthermore, electrolyte compositions that comprise a compound of Formula 1 and a compound of Formula 2 may have superior electro-chemical properties, including improved capacity retention, reduced overpotential generation at one or both electrodes during cycling, improved cyclability and capacity retention, improved compatibility with other battery components e.g. separators and current collectors, and with all types of cathode and anode chemistries, including systems that operate across a range of voltages and especially high voltages, and which include additives such as silicon. In addition, the electrolyte formulations display good solvation of metal (e.g. lithium) salts and interaction with any other electrolyte solvents present.

Moreover, electrolyte compositions that comprise a compound of Formula 1 and a compound of Formula 2 may have superior anode/cathode protection properties. For some anode/cathode materials comprising a metallic component, wherein in use the metallic component is intended to be released and then recaptured onto the anode/cathode (also known as stripping and plating) there can be issues of improper anode/cathode formation when the metallic component is redeposited. Instead of the metallic component being redeposited in a planar fashion, non-planar formations, such as dendrites may be formed. These can be highly disadvantageous, not only in terms of the battery operation (due to inferior cathode/anode structure) but also in terms of causing damages to other components of the battery. Other battery components, such as separators may be arranged closely to the anode/cathode. When dendrite formation occurs, damage to other components (such as the separator) may occur, e.g. in the form of puncturing. Such damage could cause a battery failure, such as a short circuit. The electrolyte composition of the invention has been found to address this issue. The electrolyte composition of the invention has been found to be particularly useful in addressing this issue for batteries comprising a metallic (such as a lithium) anode.

Preferred features relating to the aspects of the invention follows below. Preferences and options for a given aspect, feature or parameter of the invention should, unless the context indicates otherwise, be regarded as having been disclosed in combination with any and all preferences and options for all aspects, features and parameters of the invention.

Preferred Compounds

A preferred compound of Formula 1 has the structure:

(1)

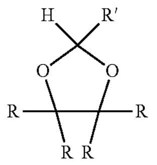

wherein R and R'═H, F, Cl, $CF_3$, alkyl or fluoroalkyl.

In a further preferred embodiment, at least one of the H groups can be replaced with $CF_3$ groups for example one, two or three H groups can be $CF_3$.

Preferably the compound of Formula 1 is prepared by a method that facilitates it recovery and purification to greater than 95%, for example greater than 99%.

A preferred compound of Formula 2 has the structure:

(2)

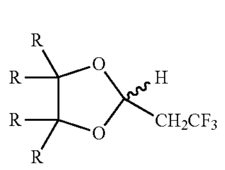

wherein R═H, F, $CF_3$, alkyl or fluoroalkyl.

In a preferred embodiment compound of Formula 2 is:

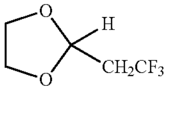

In a further preferred embodiment, at least one of the R groups can be $CF_3$. Conveniently, one, two, three or four R groups can be $CF_3$.

Preferably the compound of Formula 2 is prepared by a method that facilitates it recovery and purification to greater than 95%, for example greater than 99%.

Electrolyte Formulation

The electrolyte formulation will preferably comprise 0.1 wt % to 99.9 wt % of the composition of the compound of Formula 1 and the compound of Formula 2, conveniently 90.0 wt % to 99.9 wt % of the composition of the compound of Formula 1 and the compound of Formula 2.

Metal Salts

The nonaqueous electrolytic solution further comprises a metal electrolyte salt, typically present in an amount of 0.1 to 20 wt % relative to the total mass of the nonaqueous electrolyte formulation.

The metal salt generally comprises a salt of lithium, sodium, magnesium, calcium, lead, zinc or nickel.

Preferably the metal salt comprises a salt of lithium, such as those selected from the group comprising lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiSO_3CF_3$), lithium bis(fluorosulfonyl)imide (LiFSI, $Li(FSO_2)_2N$) and lithium bis(trifluoromethanesulfonyl)imide (LiTFSI, $Li(CF_3SO_2)_2N$).

Most preferably, the metal salt comprises $LiPF_6$, LIFSI or LiTFSI. Thus, in a most preferred variant of the fourth aspect of the invention, there is provided a formulation comprising $LiPF_6$, LiFSI, LITFSI and the composition comprising a compound of Formula 1 and a compound of Formula 2, optionally in combination with one or more co-solvents.

Solvents

The nonaqueous electrolytic solution may comprise a solvent. Preferred examples of solvents include fluoroethylene carbonate (FEC) and/or propylene carbonate (PC), dimethyl carbonate (DMC), ethyl methyl carbonate (EMC), ethylene carbonate (EC), dimethoxyethane (DME), dioxolane (DOL) or sulpholane (SOL).

Where present, the additional solvent makes up from 0.1 wt % to 99.9 wt % of the liquid component of the electrolyte.

Additives

The nonaqueous electrolytic solution may include an additive.

Suitable additives may serve as surface film-forming agents, which form an ion permeable film on the surface of the positive electrode or the negative electrode. This can pre-empt a decomposition reaction of the nonaqueous electrolytic solution and the electrolyte salt occurring on the surface of the electrodes, thereby preventing the decomposition reaction of the nonaqueous electrolytic solution on the surface of the electrodes.

Examples of film-forming agent additives include vinylene carbonate (VC), fluoroethylene carbonate (FEC), ethylene sulfite (ES), lithium bis(oxalato)borate (LiBOB), cyclohexylbenzene (CHB) and ortho-terphenyl (OTP). The additives may be used singly, or two or more may be used in combination.

When present, the additive is present in an amount of 0.1 to 3 wt % relative to the total mass of the nonaqueous electrolyte formulation.

Battery

Primary/Secondary Battery

The battery may comprise a primary (non-rechargeable) or a secondary battery (rechargeable). Most preferably the battery comprises a secondary battery.

A battery comprising the nonaqueous electrolytic solutions will generally comprise several elements. Elements making up the preferred nonaqueous electrolyte secondary battery cell are described below. It is appreciated that other battery elements may be present (such as a temperature sensor); the list of battery components below is not intended to be exhaustive.

Electrodes

The battery generally comprises a positive and a negative electrode. Usually the electrodes are porous and permit metal ions (lithium ions) to move in and out of their structures with a process called insertion (intercalation) or extraction (deintercalation).

For rechargeable batteries (secondary batteries), the term cathode designates the electrode where reduction is taking place during the discharge cycle. For lithium-ion cells the positive electrode ("cathode") is the lithium-based one.

Positive Electrode (Cathode)

The positive electrode is generally composed of a positive electrode current collector such as a metal foil, optionally with a positive electrode active material layer disposed on the positive electrode current collector.

The positive electrode current collector may be a foil of a metal that is stable at a range of potentials applied to the positive electrode, or a film having a skin layer of a metal that is stable at a range of potentials applied to the positive electrode. Aluminium (Al) is desirable as the metal that is stable at a range of potentials applied to the positive electrode.

The positive electrode active material layer generally includes a positive electrode active material, and other components such as a conductive agent and a binder. This is generally obtained by mixing the components in a solvent, applying the mixture onto the positive electrode current collector, followed by drying and rolling.

The positive electrode active material may comprise sulphur.

The positive electrode active material may be lithium (Li) or a lithium-containing transition metal oxide. The transition metal element may be at least one selected from the group consisting of scandium (Sc), manganese (Mn), iron (Fe), cobalt (Co), nickel (Ni), copper (Cu) and yttrium (Y). Of these transition metal elements, manganese, cobalt and nickel are the most preferred.

Further, in certain embodiments transition metal fluorides may be preferred.

Some of the transition metal atoms in the transition metal oxide may be replaced by atoms of a non-transition metal element. The non-transition element may be selected from the group consisting of magnesium (Mg), aluminium (Al), lead (Pb), antimony (Sb) and boron (B). Of these non-transition metal elements, magnesium and aluminium are the most preferred.

Preferred examples of positive electrode active materials include lithium-containing transition metal oxides such as $LiCoO_2$, $LiNiO_2$, $LiMn_2O_4$, $LiMnO_2$, $LiN_{1-y}Co_yO_2$ ($0<y<1$), $LiN_{1-y-z}Co_yMn_zO_2$ ($0<y+z<1$) and $LiN_{1-y-z}Co_yAl_zO_2$ ($0<y+z<1$). $LiN_{1-y-z}Co_yMn_zO_2$ ($0<y+z<0.5$) and $LiN_{1-y-z}Co_yAl_zO_2$ ($0<y+z<0.5$) containing nickel in a proportion of not less than 50 mol % relative to all the transition metals are desirable from the perspective of cost and specific capacity. These positive electrode active materials contain a large amount of alkali components and thus accelerate the decomposition of nonaqueous electrolytic solutions to cause a decrease in durability. However, the nonaqueous electrolytic solution of the present disclosure is resistant to decomposition even when used in combination with these positive electrode active materials.

The positive electrode active material may be a lithium (Li) containing transition metal fluoride. The transition metal element may be at least one selected from the group consisting of scandium (Sc), manganese (Mn), iron (Fe), cobalt (Co), nickel (Ni), copper (Cu) and yttrium (Y). Of these transition metal elements, manganese, cobalt and nickel are the most preferred.

Some of the transition metal atoms in the transition metal fluoride may be replaced by atoms of a non-transition metal element. The non-transition element may be selected from the group consisting of magnesium (Mg), aluminium (Al), lead (Pb), antimony (Sb) and boron (B). Of these non-transition metal elements, magnesium and aluminium are the most preferred.

A conductive agent may be used to increase the electron conductivity of the positive electrode active material layer. Preferred examples of the conductive agents include conductive carbon materials, metal powders and organic materials. Specific examples include carbon materials as acetylene black, ketjen black and graphite, metal powders as aluminium powder, and organic materials as phenylene derivatives.

A binder may be used to ensure good contact between the positive electrode active material and the conductive agent, and to increase the adhesion of the components such as the positive electrode active material with respect to the surface of the positive electrode current collector. Preferred examples of the binders include fluoropolymers and rubber polymers, such as polytetrafluoroethylene (PTFE), polyvinylidene fluoride (PVdF) ethylene-propylene-isoprene copolymer and ethylene-propylene-butadiene copolymer. The binder may be used in combination with a thickener such as carboxymethylcellulose (CMC) or polyethylene oxide (PEO).

Negative Electrode (Anode)

The negative electrode is generally composed of a negative electrode current collector such as a metal foil, optionally with a negative electrode active material layer disposed on the negative electrode current collector.

The negative electrode current collector may be a foil of a metal. Copper (lithium-free) is suitable as the metal. Copper is easily processed at low cost and has good electron conductivity. The anode may comprise lithium metal, the electrolyte formulation of the invention has been found to be particularly beneficial in preventing dendrite formation when used with lithium anodes.

Generally, the negative electrode comprises carbon, such as graphite or graphene or lithium metal. In a preferred embodiment, the negative electrode is lithium metal.

Silicon based materials can also be used for the negative electrode. A preferred form of silicon is in the form of nano-wires, which are preferably present on a support material. The support material may comprise a metal (such as steel) or a non-metal such as carbon.

The negative electrode may include an active material layer. Where present the active material layer includes a negative electrode active material and other components such as a binder. This is generally obtained by mixing the components in a solvent, applying the mixture onto the positive electrode current collector, followed by drying and rolling.

Negative electrode active materials are not particularly limited, provided the materials can store and release lithium ions. Examples of suitable negative electrode active materials include carbon materials, metals, alloys, metal oxides, metal nitrides, and lithium-intercalated carbon and silicon. Examples of carbon materials include natural/artificial graphite, and pitch-based carbon fibres. Preferred examples of metals include lithium (Li), silicon (Si), tin (Sn), germanium (Ge), indium (In), gallium (Ga), titanium (Ti), lithium alloys, silicon alloys and tin alloys. Examples of lithium-based material include lithium titanate ($Li_2TiO_3$).

The active material may can be in many forms such as a thin film, foil or supported on a three-dimensional matrix.

As with the positive electrode, the binder may be a fluoropolymer or a rubber polymer and is desirably a rubbery polymer, such as styrene-butadiene copolymer (SBR). The binder may be used in combination with a thickener.

In a preferred embodiment, the negative electrode is lithium metal, in a secondary battery; conveniently in such embodiments, but also in other embodiments with other negative electrodes and in other battery types, the electrolyte comprises LiTFSI and/or LiFSI, dimethoxyethane, and a composition comprising a compound of Formula 1 and a compound of Formula 2.

Separator

A separator is preferably present between the positive electrode and the negative electrode.

The separator has insulating properties. The separator may comprise a porous film having ion permeability. Examples of porous films include microporous thin films, woven fabrics and nonwoven fabrics. Suitable materials for the separators are polyolefins, such as polyethylene and polypropylene.

Case

The battery components are preferably disposed within a protective case.

The case may comprise any suitable material which is resilient to provide support to the battery and an electrical contact to the device being powered.

In one embodiment the case comprises a metal material, preferably in sheet form, moulded into a battery shape. The metal material preferably comprises a number of portions adaptable be fitted together (e.g. by push-fitting) in the assembly of the battery. Preferably the case comprises an iron/steel-based material.

In another embodiment the case comprises a plastics material, moulded into a battery shape. The plastics material preferably comprises a number of portions adaptable be joined together (e.g. by push-fitting/adhesion) in the assembly of the battery. Preferably the case comprises a polymer such as polystyrene, polyethylene, polyvinyl chloride, polyvinylidene chloride, or polymonochlorofluoroethylene. The case may also comprise other additives for the plastics material, such as fillers or plasticisers. In this embodiment wherein the case for the battery predominantly comprises a plastics material, a portion of the casing may additionally comprise a conductive/metallic material to establish electrical contact with the device being powered by the battery.

Arrangement

The positive electrode and negative electrode may be wound or stacked together through a separator. Together with the nonaqueous electrolytic solution they are accommodated in the exterior case. The positive and negative electrodes are electrically connected to the exterior case in separate portions thereof.

Module/Pack

A number/plurality of battery cells may be made up into a battery module. In a battery module the battery cells may be organised in series and/or in parallel. Typically, these are encased in a mechanical structure.

A battery pack may be assembled by connecting multiple modules together in a series or parallel. Typically, battery packs include further features such as sensors and controllers including battery management systems and thermal management systems. The battery pack generally includes an encasing housing structure to make up the final battery pack product.

End Uses

The battery of the invention, in the form of an individual battery/cell, module and/or pack (and the electrolyte formulations therefor) are intended to be used in one or more of a variety of end products.

Preferred examples of end products include portable electronic devices, such as GPS navigation devices, cameras laptops, tablets and mobile phones. Other preferred examples of end products include vehicular devices (as provision of power for the propulsion system and/or for any electrical system or devices present therein), such as electrical bicycles and motorbikes, as well as automotive applications (including hybrid and purely electric vehicles).

Preferences and options for a given aspect, feature or parameter of the invention should, unless the context indicates otherwise, be regarded as having been disclosed in combination with any and all preferences and options for all other aspects, features and parameters of the invention.

The invention will now be illustrated with reference to the following non-limiting examples.

EXAMPLES

Preparation Example of a Compound of Formula 1 (3,3,3-trifluoro-1(2,2,2-trifluoroethoxy)prop-1-ene (Mexi-1))

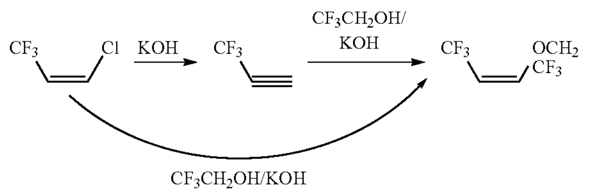

Potassium Hydroxide flakes (~85% KOH by weight, 635 g) were dissolved in water (1200 g). The solution was added to a 5-litre flask equipped with a heating mantle, stirrer, addition funnel and dry ice condenser. Tetrabutylammonium Bromide (22 g) was added to the flask with trifluoroethanol (600 g) and the resulting mixture heated to 45° C. with stirring. Once at temperature Z-1-Chloro-3,3,3-trifluoropropene-1 (cis-1-Chloro-3,3,3-trifluoropropene-1, 800 g) was added to the flask in 20 ml aliquots. After each addition a vigorous reflux was observed, which subsided after a few minutes, permitting additional alkene to be added. After the alkene addition was complete the reaction mixture was stirred for two hours and then allowed to cool to room temperature. An organic layer separated and was recovered and washed with dilute HCl, followed by water. The product was purified by flash distillation using a spinning band column and dried over calcium hydride. The recovered yield was 46%. The product was confirmed by GC-MS and NMR spectroscopy:

m/z: 69 ($CF_3$), 75, 77, 83 ($CF_3CH_2$), 91, 93, 95 ($CF_3CH{=}CH$), 125 (M-69), $CF_3CH{=}CHOCH_2$), 175 (M-19), 194 (M)

$^{19}F$ NMR (56 MHz) ($CDCl_3$ vs PFB): δ −59.78 ($CF_3CH{=}$, dd, J=8.1, 2.1 Hz), −77.15 ($CF_3CH_2$, t, J=8.1 Hz)

Preparation Examples of Compounds of Formula 2 a) 5-Trifluoromethyl-2-(2,2,2-Trifluoroethyl)-1,3-Dioxolane (Mexi-19)

Mexi-19 was prepared by the cycloaddition of 3,3,3-Trifluoropropanal and 3,3,3-Trifluoropropane-1,2-diol:

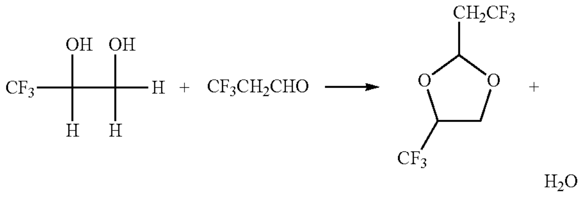

3,3,3-Trifluoropropanal was freshly prepared from 3,3,3-Trifluoropropionaldehyde hydrate by dehydrating it with phosphorous pentoxide and used immediately. 850 g of the freshy prepared aldehyde was charged to a 5-liter flask equipped with a magnetic stirrer, heating mantle, modified Dean Stark trap, and reflux condenser. 930 grams (7.15 moles) of 3,3,3-Trifluoropropane-1,2-diol was added, followed by two liters of Methylene Chloride and 20 grams of p-Toluenesulfonic Acid Monohydrate catalyst. The mixture was refluxed vigorously for 48 hours whilst the water generated by the reaction was continuously removed.

After cooling to room temperature, the reaction mixture was neutralized by washing with one litre of saturated aqueous sodium bicarbonate solution in a separatory funnel followed by two washes with one litre of water.

The organic (bottom) phase was dried with anhydrous magnesium sulfate and filtered. Dichloromethane and unreacted aldehyde were stripped off on a rotary evaporator. The crude product was fractionally distilled using a spinning band column to give a product of >99.6% purity (from the GC area %), boiling point 58° to 60° C. @ 25 mmHg. Two diastereomers were present in a ratio of approximately 5:1. The yield was 1.046 grams (65% of the theoretical maximum based on the limiting diol reactant).

The product was dried over 3 Å molecular sieves and its structure confirmed by $^{19}F$ NMR spectroscopy:

$^{19}F$ NMR (56 MHz) δ −61.4, 61.7 (t, J=10.6 Hz), 75.6, 76.7 (d, J=6.2 Hz).

b) 2-(2,2,2-trifluoroethyl-1,3-Dioxolane (Mexi-20)

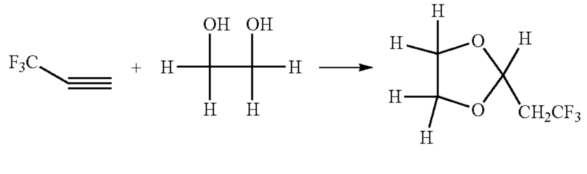

Potassium hydroxide (4.02 g 85% wt) was dissolved in ethylene glycol (20 g) with stirring in a 100 ml pressure reactor vessel. Once dissolution was complete the reactor vessel was sealed, purged with nitrogen and the contents heated to 40° C. with stirring before being pressurised with trifluoromethyl acetylene (TFMA) to 8 barg. After 52 minutes the pressure had dropped to 6.4 barg and was re-pressurised to 10 barg with more TFMA. This pattern of pressure loss and re-pressurisation was repeated several times over 6 hours before the final pressurisation to 10 barg with TFMA. After 72 hours further stirring at 40° C. the final pressure in the reactor vessel was 6.4 barg.

After cooling and depressurisation, the contents of the reactor were recovered as a viscous yellow oil. To this oil was added 21 g of water which affected a phase separation. The lower organic layer was recovered and repeatedly washed with 50 ml aliquots of water. The product was dried over anhydrous sodium sulphate to yield 16.1 g of product.

The crude product was analysed by GC-MS which showed that it comprised the desired product and an unsaturated ether by-product identified as $CF_3CH{=}CHOCH_2CH_2OH$ in the ratio 6.1:1.

The desired product was separated from the by-products in the crude product by distillation and was analysed by $^{19}F$ NMR (56 MHz) δ −64.5 (t, J=11.0 Hz). The mass spectrum of the desired product contained characteristic fragments at m/z 155, 126, 111, 73, 69, 45.

For preparative purposes this procedure was scaled-up. KOH (40 g, 85%) was dissolved in ethylene glycol (200 g) and transferred to a 450 ml Hastelloy autoclave. The autoclave was sealed, pressure tested and purged with nitrogen before the contents were heated to 4° C. with stirring. When at temperature the autoclave was pressurised with TFMA to 9-10 Barg. The pressure inside the vessel dropped as the TFMA reacted. When the pressure had dropped to around 3 barg the vessel was re-pressurised with TFMA. This cycle of reaction and re-pressurisation steps was continued until the rate of TFMA consumption became negligible. In a typical procedure the reactor would be re-pressurised 5-6 times over the course of 3 days or so.

Five batches of crude product were prepared. The crude product was separated from the reaction mixtures by quenching with water, which caused the product to separate allowing it to be recovered. The separated crude product was further washed with water to remove traces of potassium salts before being dried over sodium sulphate. The product from each of the batches were combined to yield 269 g of a pale-yellow oil which was analysed by GCMS and found to comprise 93% of the desired product 2-(2,2,2-trifluoroethyl)-1,3-dioxolane.

The crude product was further purified by distillation using a packed column which yielded the following fractions:

| Fraction | Boiling point (° C.) | Mass (g) | Purity (GCMS, area %) |
|---|---|---|---|
| 1 | 110 | 44.0 | 92.5 |
| 2 | 114 | 36.5 | 98.9 |
| 3 | 114 | 50.4 | 99.5 |
| 4 | 114 | 43.5 | 99.5 |
| 5 | 114 | 9.3 | 99.1 |
| 6 | 114 | 6.3 | 99.1 |
| Residue | — | Balance | 87.7 |

Fractions 2-6 were combined and analysed by a combination of GC-MS and multi-nuclear NMR spectroscopy:

Purity (GC-MS Area %) 99.1

Mass spectrum m/z: 155, 126, 111, 91, 77, 73, 69, 57, 45, 43

$^{1}H$ NMR (60 MHz) δ 5.12 (t, J=5.12 Hz, 1H), 3.92 (d, J=2.1 Hz, 4H), 2.48 (qd, J=10.9, 4.8 Hz, 2H)

$^{19}F$ NMR (56 MHz) δ −64.5 (t, J=11.0 Hz)

$^{13}C$ NMR (15 MHz) δ 125.97 (q, j=276.2 Hz), 99.37 (q, 3.9 Hz), 65.46 (s), 39.47 (q, 27.6 Hz)

This spectral information unequivocally confirms that the purified product was the desired compound of Formula 1:2-(2,2,2-trifluoroethyl)-1,3-Dioxolane (Mexi-20).

Physical Property Comparison

The compounds (and some reference compounds) were found to have the following properties.

| Property | Mexi-1 | Mexi-19 | Mexi-20 | EC | DMC | EMC | DME |
|---|---|---|---|---|---|---|---|
| Melting point (° C.) | −61.8 | −30.5 | −20.3 | 36.4 | 4.6 | −53.0 | −58 |
| Boiling point (° C.) | 114 | 125 | 123 | 248 | 91 | 107 | 85 |
| Flash point (° C.) | Not detected | 138 ± 4 | 41 ± 1 | 160 | 18 | 24 | −2 |
| Self-extinguishing time (s) | 14 ± 2 | Not measured | 28 ± 2 | Not ignitable | 122 ± 4 | 143 ± 11 | 122 ± 3 |

Key:
Mexi-1 = 3,3,3-trifluoro-1(2,2,2-trifluoroethoxy)prop-1-ene
Mexi-19 = 5-Trifluoromethyl-2-(2,2,2-Trifluoroethyl)-1,3-Dioxolane
Mexi-20 = 2-(2,2,2-trifluoroethyl)-1,3-Dioxolane
EC = Ethylene carbonate;
DMC = dimethyl carbonate;
EMC = ethyl methyl carbonate;
DME = dimethoxyethane The data in this table demonstrates that substitution of the solvents commonly used in electrolyte compositions with the compounds of this invention will lead to improved safety and temperature operating range.

To confirm this was the case a series of electrolytes were prepared and their flash points measured:

| 1M LiTFSI in: | Flash Point (° C.) |
|---|---|
| 1 DME: 1 DOL | <5 |
| 1 Mexi-1: 1 DOL | 20 ± 5 |
| 2 Mexi-1: 8 Mexi-20 | 45 ± 2 |

Note:
DME = dimethoxyethane and DOL = 1,3-dioxolane

Electrochemical Testing

Symmetrical Li/Li/Li Cells

Three electrolyte solutions were prepared in an argon purged glovebox:

1. Base electrolyte: 1M LiTFSI in DME:DOL (1:1 wt. %)
2. Control electrolyte: 1M LiTFSI in Mexi-1:DOL (1:1 wt. %)
3. Control electrolyte: 1M LiTFSI in Mexi-1:Mexi 20 (2:8 wt. %)

Symmetrical three-electrode Li/electrolyte/Li cells (Swagelok cells) were prepared and filled with base and control electrolyte solutions. This cell chemistry was chosen because it is the "state of the art" cell chemistry for measuring the evolution of overpotential during the stripping and plating of metallic lithium as the cells were cycled.

Once assembled the cells were cycled at 0.1 $mA/cm^2$. Charge and discharge times were 1 h each (a cycle is defined as a charging step followed by a discharge step) and the cells were cycled in this manner for 25 days at 20° C. Test results are summarized in FIGS. 1-3 and below:

1. Base electrolyte (FIG. 1): 1M LiTFSI in DME:DOL (1:1 wt. %)
   a. Exponential increase of overpotentials during continuous stripping and plating of lithium metal caused by a large degradation of the electrolyte on the Li electrode with significant cell to cell variation
2. Control electrolyte (FIG. 2): 1M LiTFSI in Mexi-1: DOL (1:1 wt. %)
   a. Constant very low overpotentials during continuous stripping and plating of lithium metal that remained stable over the hole course of the measurement that were highly reproducible cell to cell
3. Control electrolyte (FIG. 3): 1M LiTFSI in Mexi-1: Mexi 20 (2:8 wt. %)
   a. Constant very low overpotentials during continuous stripping and plating of lithium metal that remained stable over the hole course of the measurement that were highly reproducible cell to cell Thus, it can be seen that the cells containing the control electrolytes performed better than those containing the base electrolyte.

Electrochemical Measurements in Cu/Li Cells

Two electrode Cu/electrolyte/Li cells (Coin cells) were filled with base and control electrolytes described above. This cell chemistry was chosen because it is the "state of the art" cell chemistry for measuring the stripping and plating behavior of metallic lithium as well as the evolution of the Coulombic efficiency (CE) during cycling. Once assembled the coin cells were cycled at 1 $mA/cm^2$ for 1 h for the charge process (lithium deposition) and 0.25 $mA/cm^2$ for the discharge process (lithium dissolution) until the cut-off voltage for the Cu electrode of 1 V was reached (a cycle is defined as a charge step followed by a discharge step). The cells were cycled for 100 cycles (~25 days) at 20° C. Test results are summarized in FIGS. 4-6 and below:

1. Base electrolyte (FIG. 4): 1M LiTFSI in DME:DOL (1:1 wt. %)
   a. CE increased over the first 10 cycles up to ~88%
   b. Strong Increase and fluctuation of discharge capacity and CE during continuous stripping and plating of lithium metal starting after 35 cycles on the Cu electrode indicates the formation of high surface area lithium
   c. The increase of the CE beyond 100% was a clear indication of the formation of lithium metal dendrites causing short circuits in the cell leading to cell performance degradation and failure
2. Control electrolyte (FIG. 5): 1M LiTFSI in Mexi-1: DOL (1:1 wt. %)
   a. Slightly lower CE (~78%) compared to the base electrolyte but stable discharge capacity and CE evolution during continuous stripping and plating of lithium metal
   b. The CE and discharge capacity started to fade after 53 cycles c. This stable performance was an indication of the formation of a more effective surface layer on Cu with this electrolyte d. There was no evidence for the formation of lithium metal dendrites leading to short cuts in the cell 3. Control electrolyte (FIG. 6): 1M LiTFSI in Mexi-1: Mexi 20 (2:8 wt. %)

a. Strong increase of CE (~95%) for the lithium stripping/deposition process from/onto Cu electrode compared to the base electrolyte with stable discharge capacity and CE evolution.

b. The CE and discharge capacity started to fade after 66 cycles c. This stable performance was an indication of the formation of a more effective surface layer on Cu with this electrolyte Thus, it can be seen from the various examples that the compounds of the invention can be used to improve the safety and efficiency of electrochemical storage devices.

FIGURES

Figure 1:
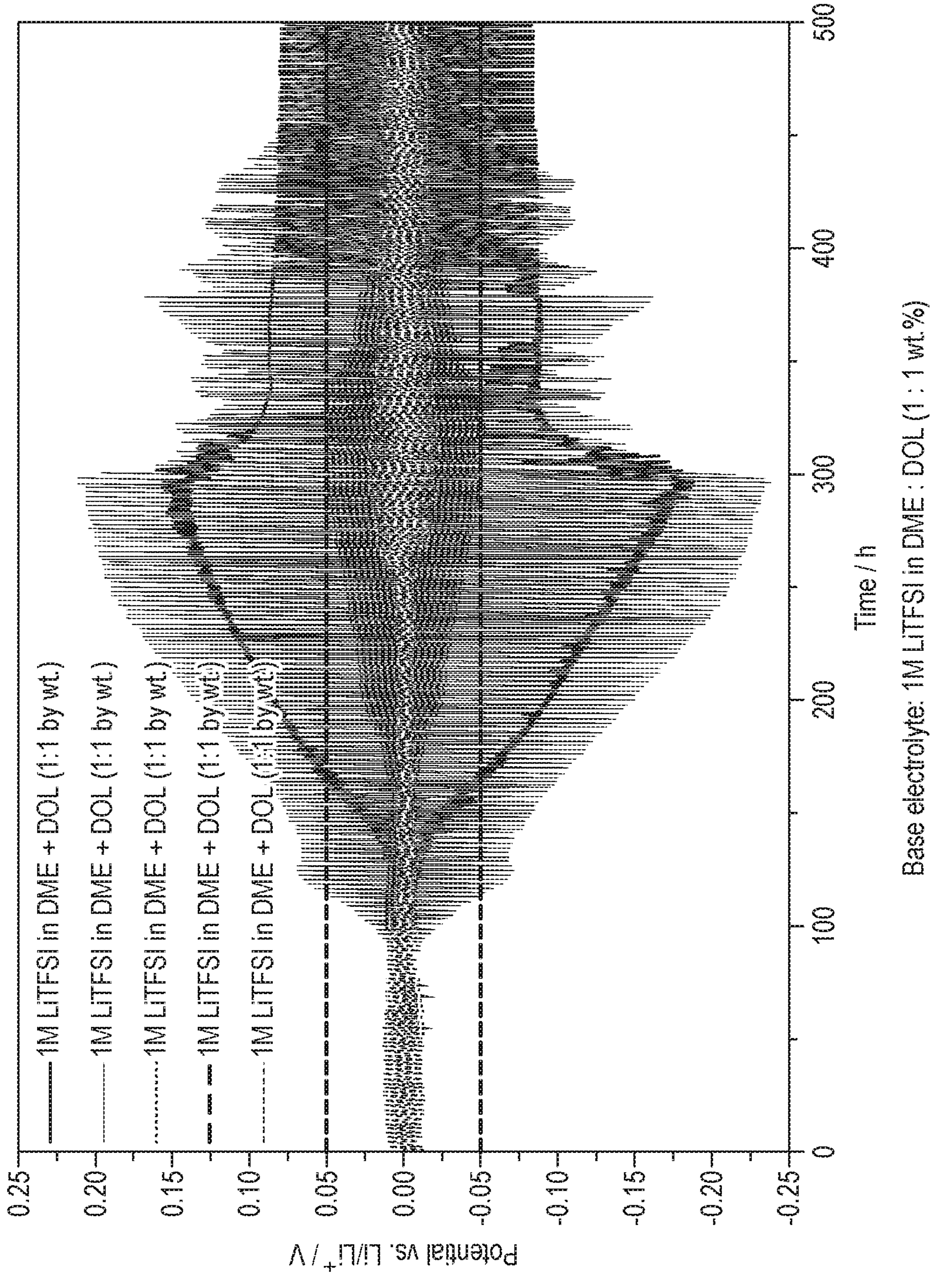
FIG. 1 shows overpotential developed during cyclic lithium stripping and plating with the base electrolyte: 1M LiTFSI in DME:DOL (1:1 wt. %).
Figure 2:
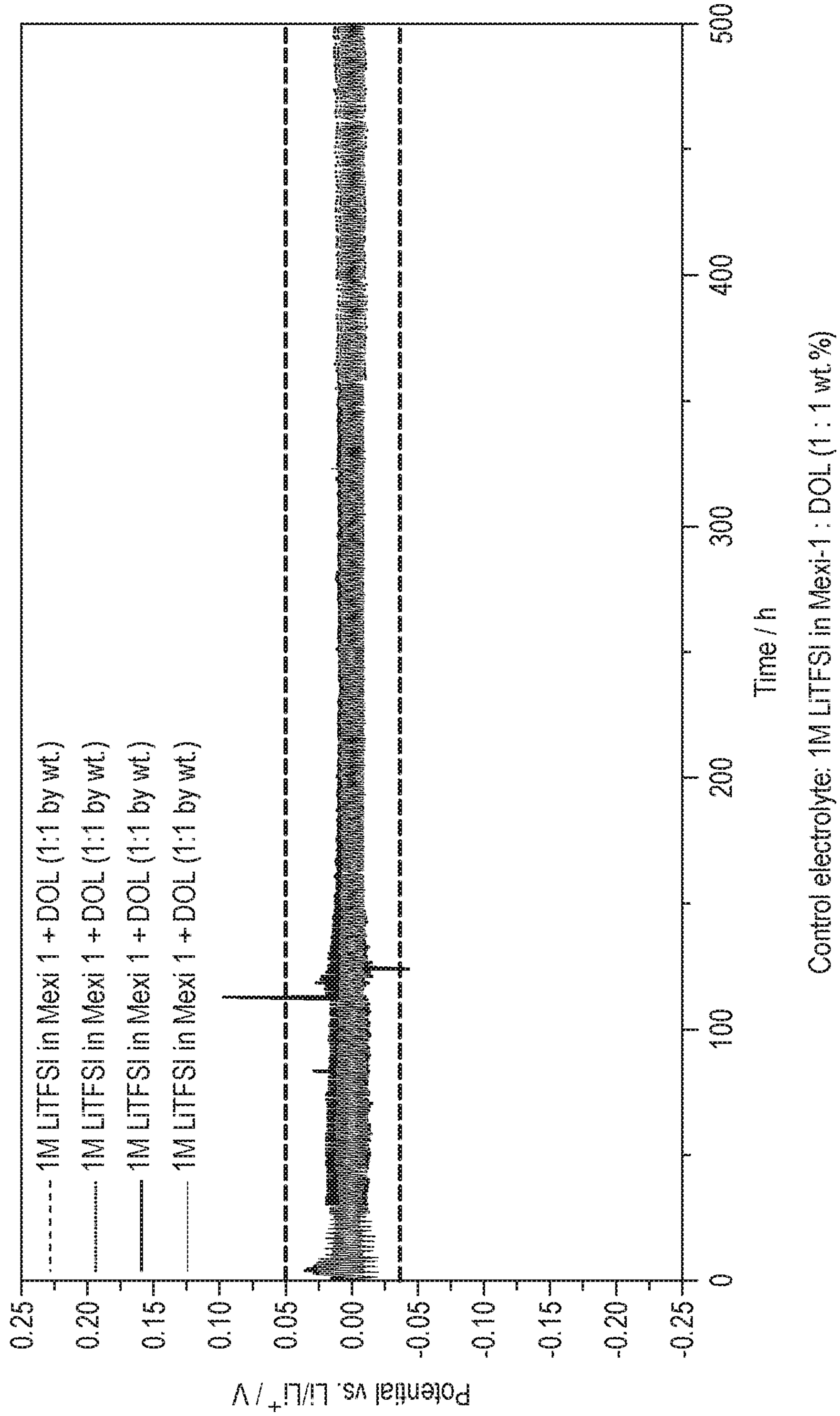
FIG. 2 shows overpotential developed during cyclic lithium stripping and plating with the control electrolyte: 1M LiTFSI in Mexi-1:DOL (1:1 wt. %).
Figure 3:
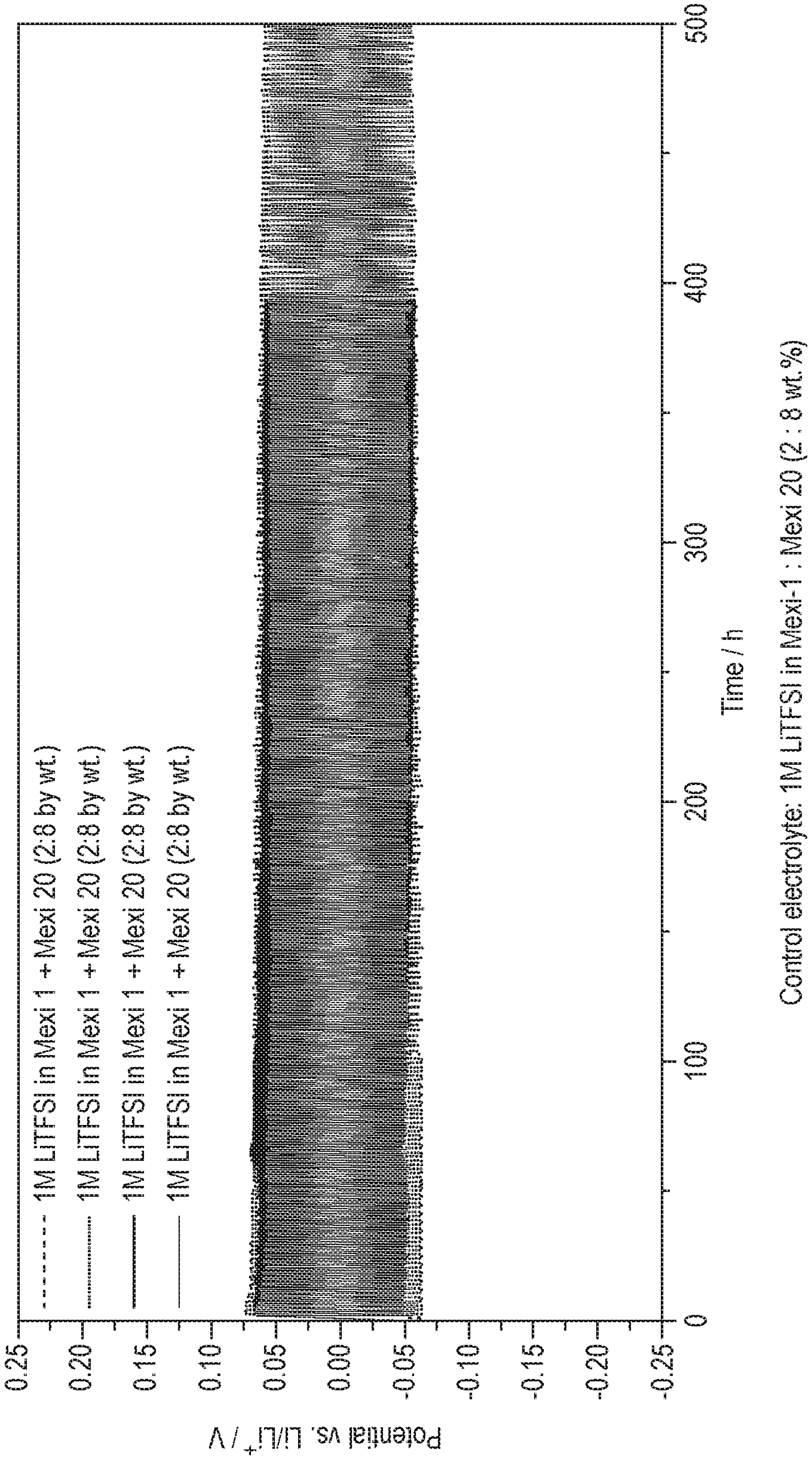
FIG. 3 shows overpotential developed during cyclic lithium stripping and plating with the control electrolyte: 1M LiTFSI in Mexi-1:Mexi 20 (2:8 wt. %).
Figure 4:
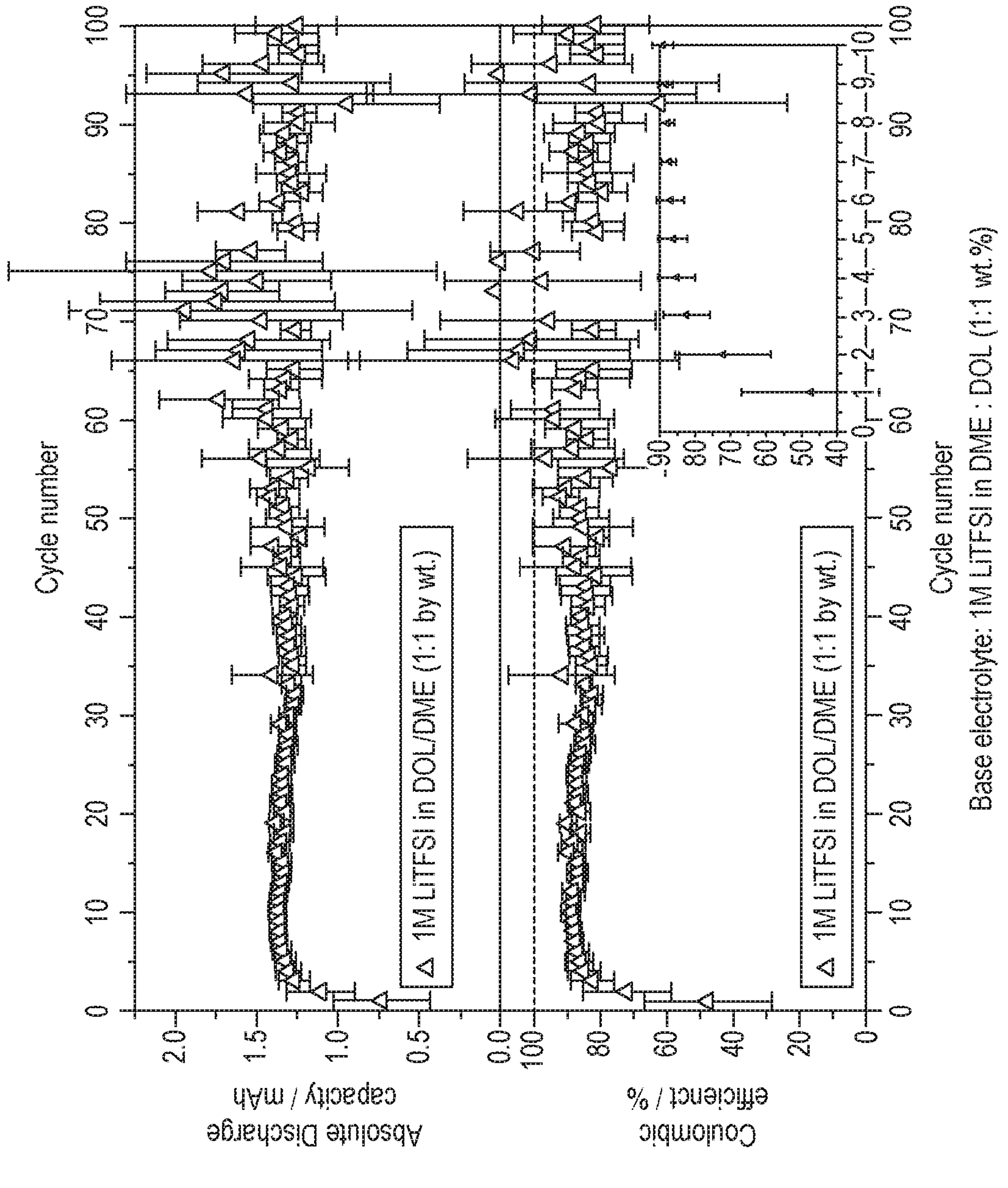
FIG. 4 shows the discharge capacity and coulombic efficiency of the cells containing 1M LiTFSI in DME:DOL (1:1 wt. %) electrolyte developed as they were cycled.
Figure 5:
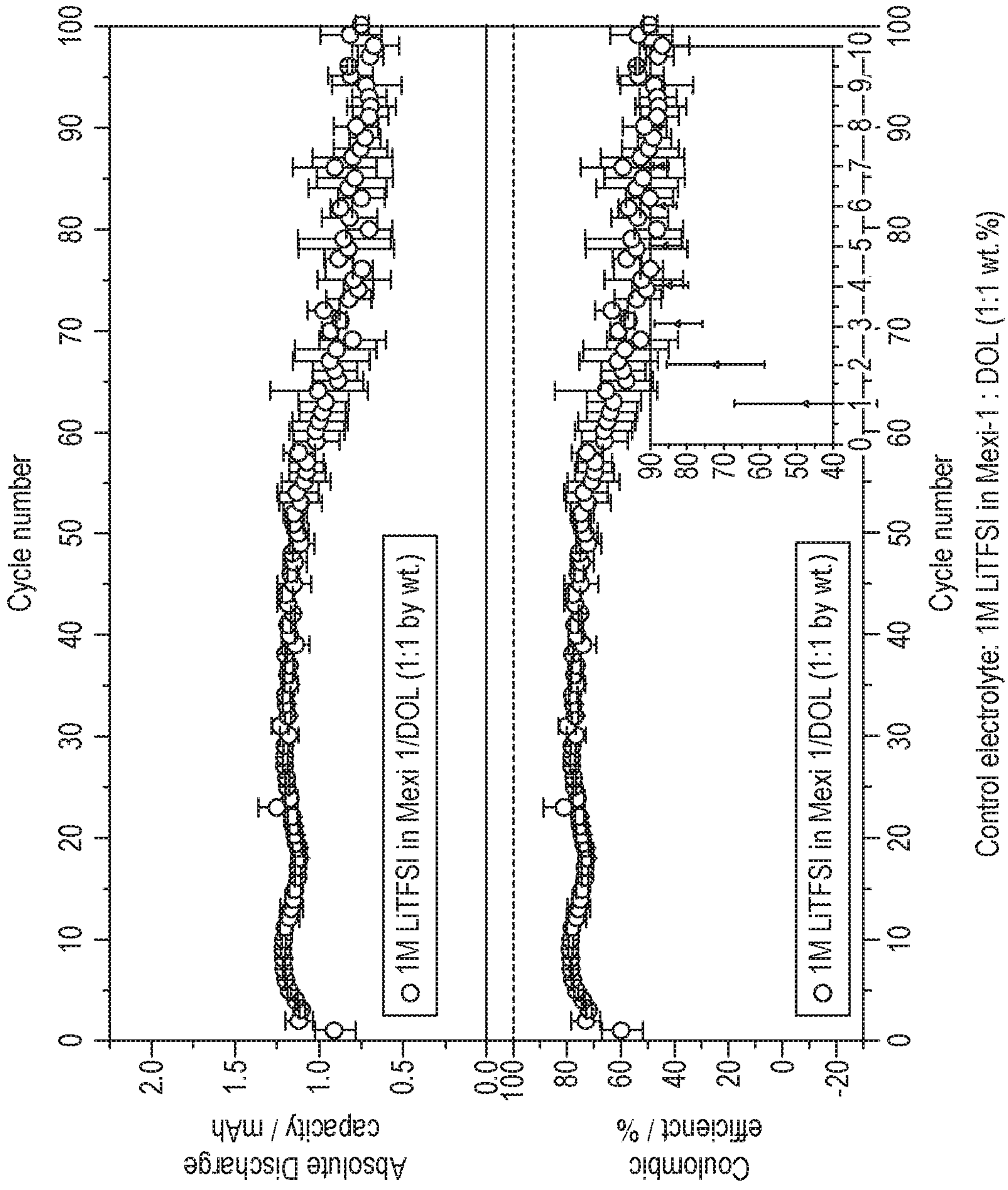
FIG. 5 shows the discharge capacity and coulombic efficiency of the cells containing 1M LiTFSI in Mexi-1:DOL (1:1 wt. %) electrolyte developed as they were cycled.
Figure 6:
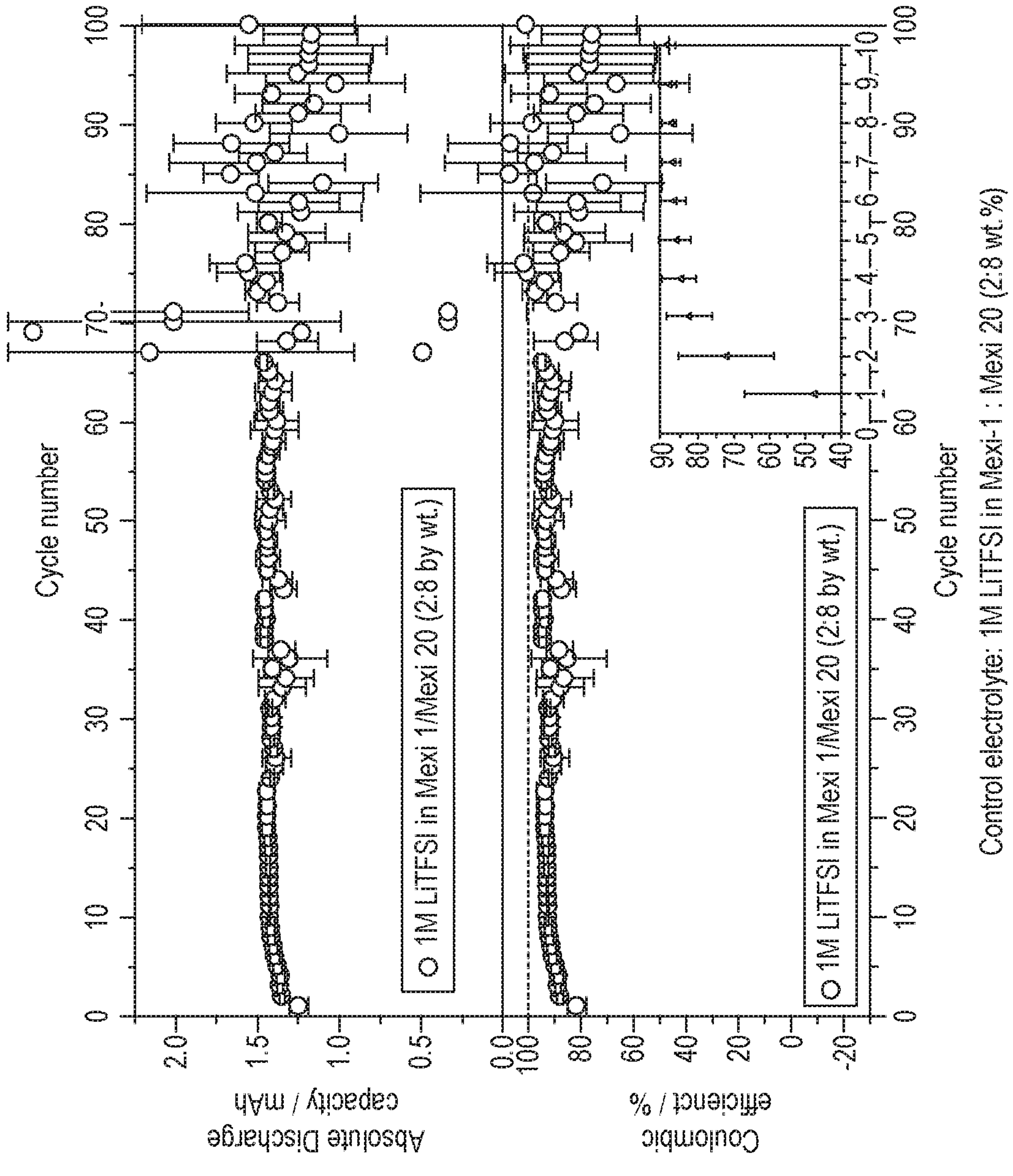
FIG. 6 shows the discharge capacity and coulombic efficiency of the cells containing 1M LiTFSI in Mexi-1: Mexi 20 (2:8 wt. %) electrolyte developed as they were cycled.
Figure 7A:
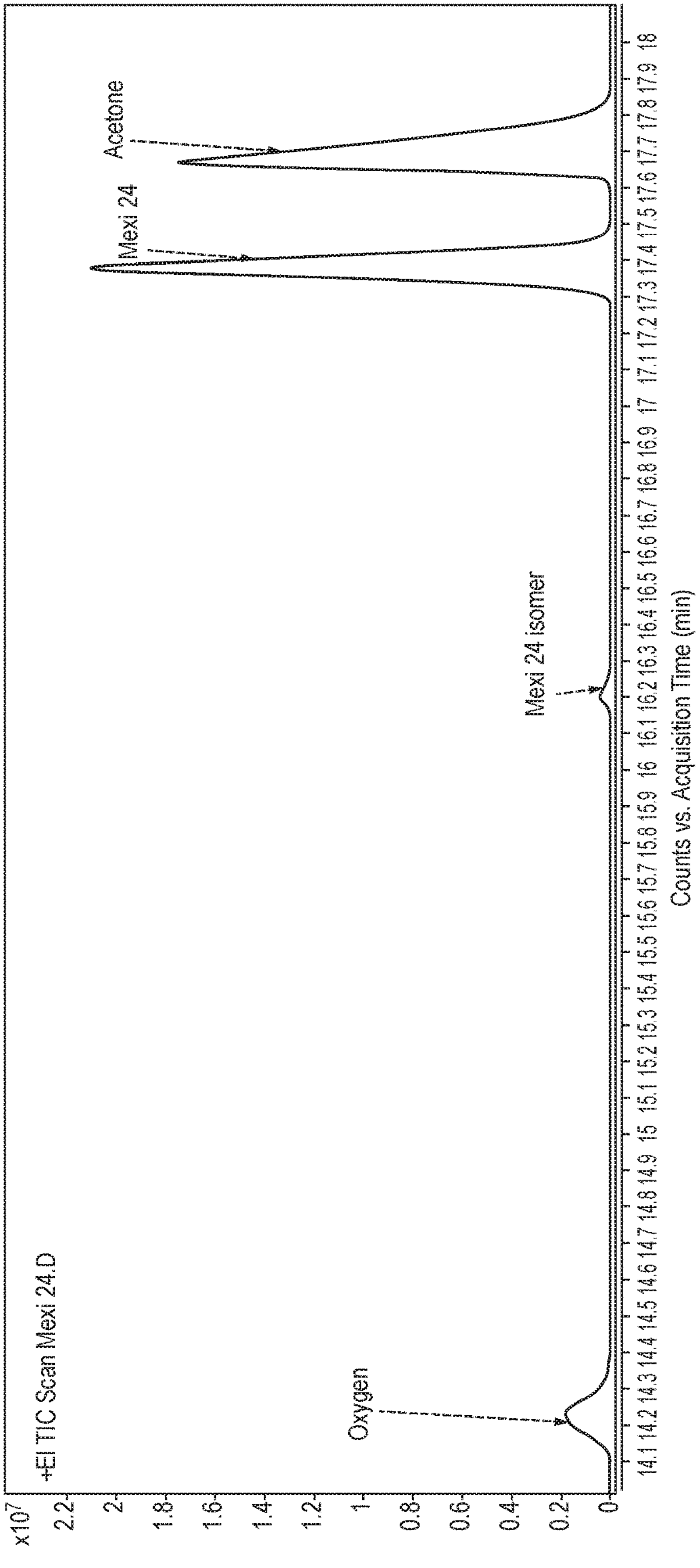
Figure 7B:
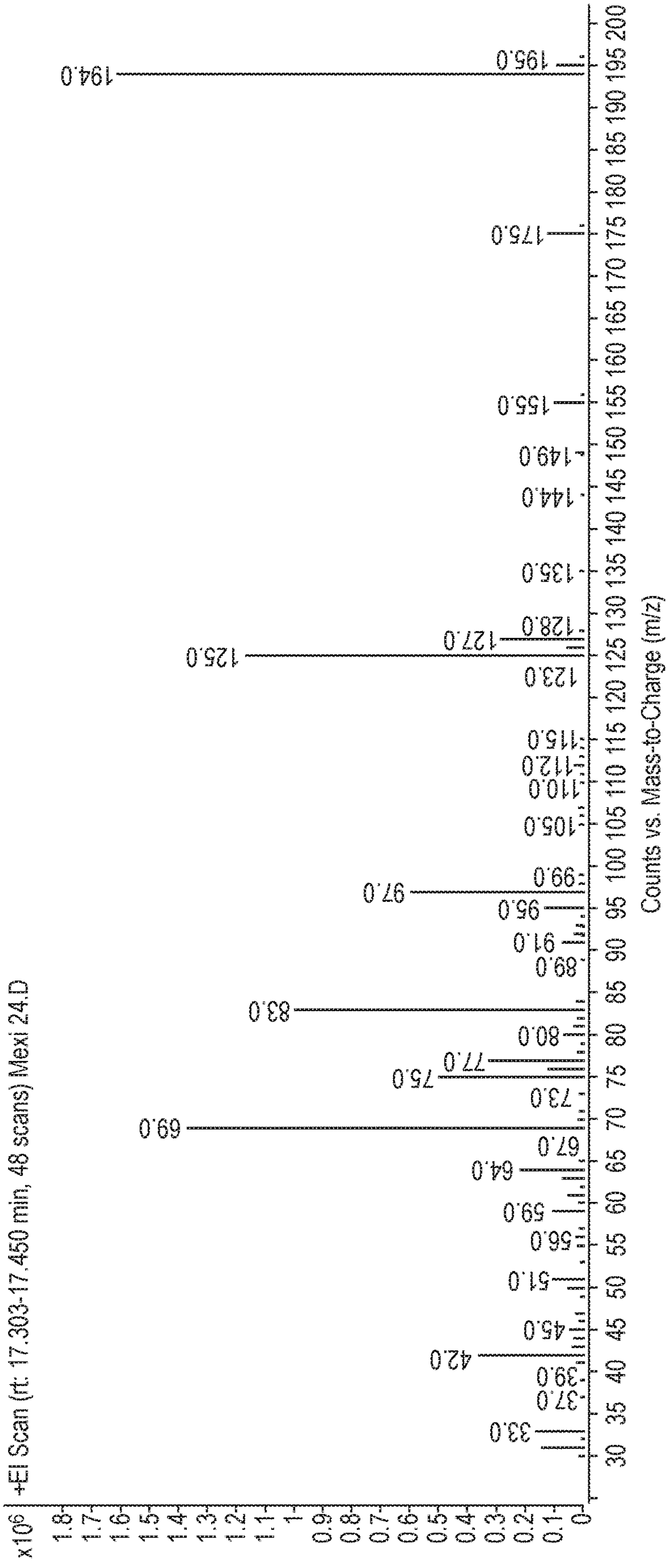

FIGS. 7*a* and 7*b* show the Gas Chromatograph and Mass Spectral analysis of cis $(CF_3)(CF_3CH_2O)CCH_2$.

Mass spectrum m/z: 194 ([M]+), 175 ([M-F]+), 125 ([M-$CF_3$]+), 97, 83 ([$CF_3$CH2]+), 69 ([$CF_3$]+), 42

Figure 8:
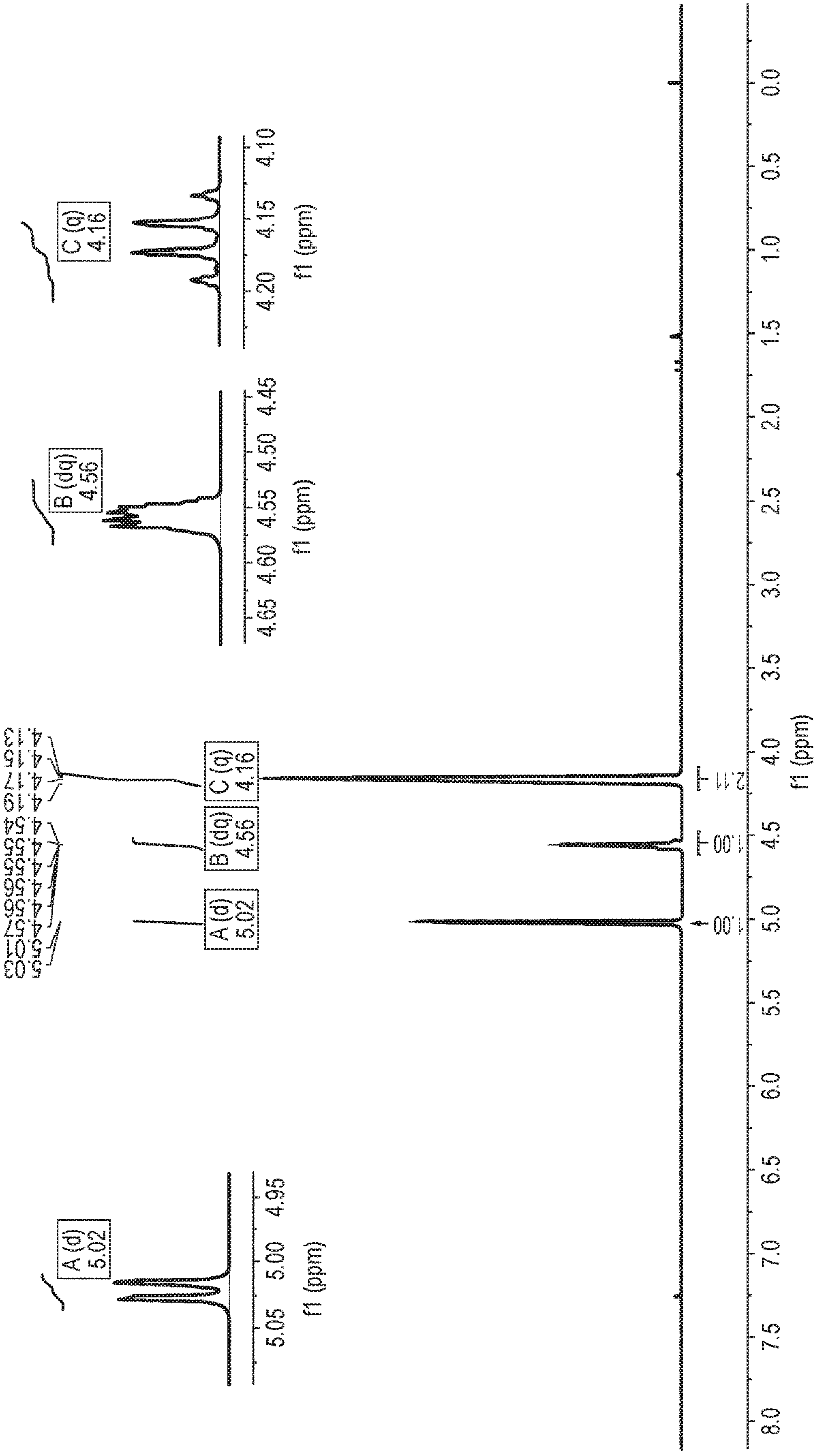
Figure 9:
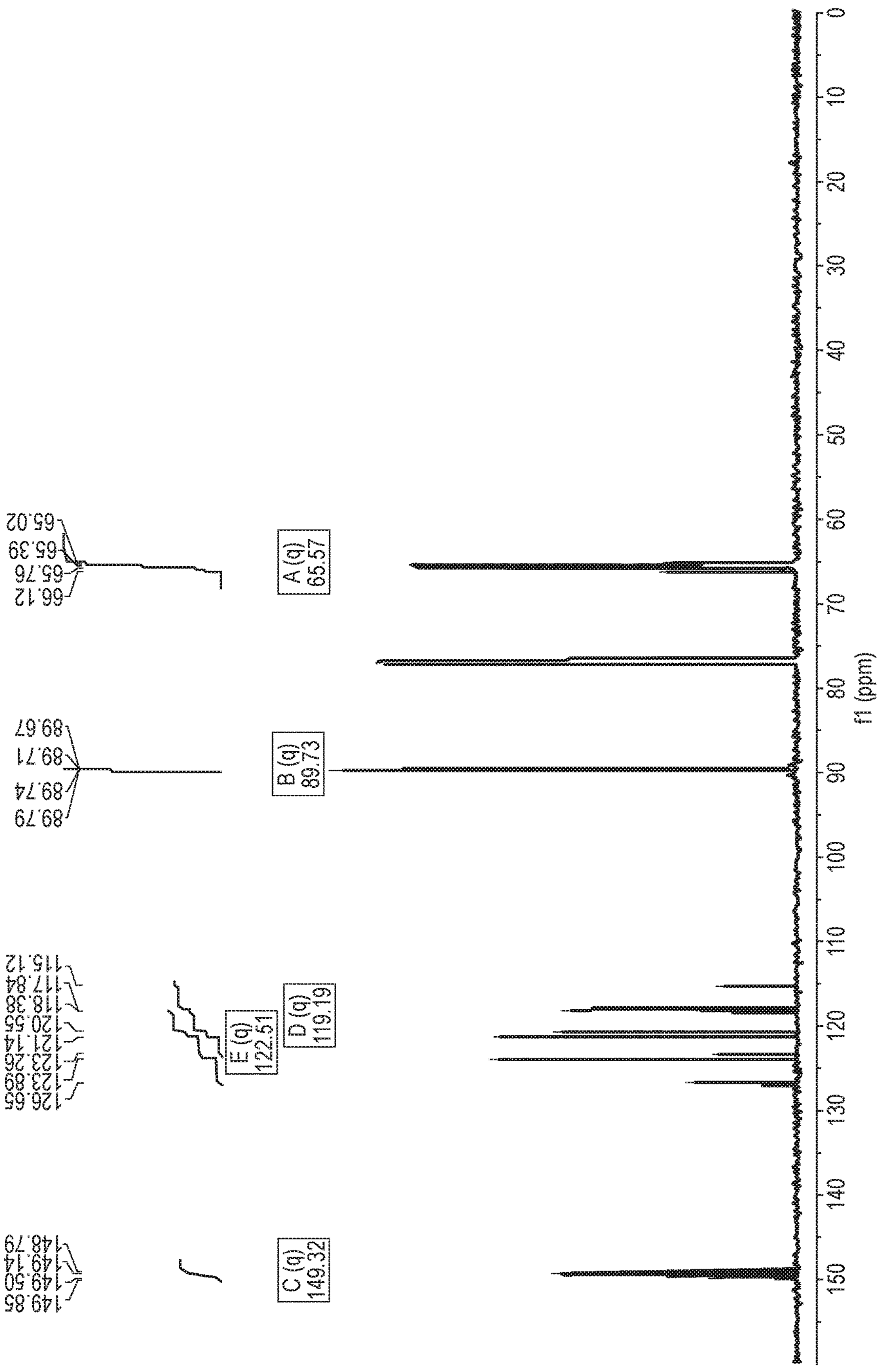

FIGS. 8 and 9 show the NMR Spectral analysis of cis $(CF_3)(CF_3CH_2O)CCH_2$.

$^1$H NMR (400 MHz, CDCl3) 5.02 (1H, d, 3JH-H=4.8 Hz, H1 or H2), 4.56 (1H, qd, 3JH-F=4.0 Hz, 3JH-H=2.0 Hz, H1 or H2), 4.16 (2H, q, 3JH-F=7.8 Hz, H3).

$^{13}$C NMR (101 MHz, CDCl3) 149.32 (q, 2JC-F=36.0 Hz), 122.51 (q, 1JC-F=277.3 Hz), 119.19 (q, 1JC-F=272.7 Hz), 89.73 (q, 3JC-F=3.6 Hz), 65.57 (q, 2JC-F=37.0 Hz).

Figure 10:
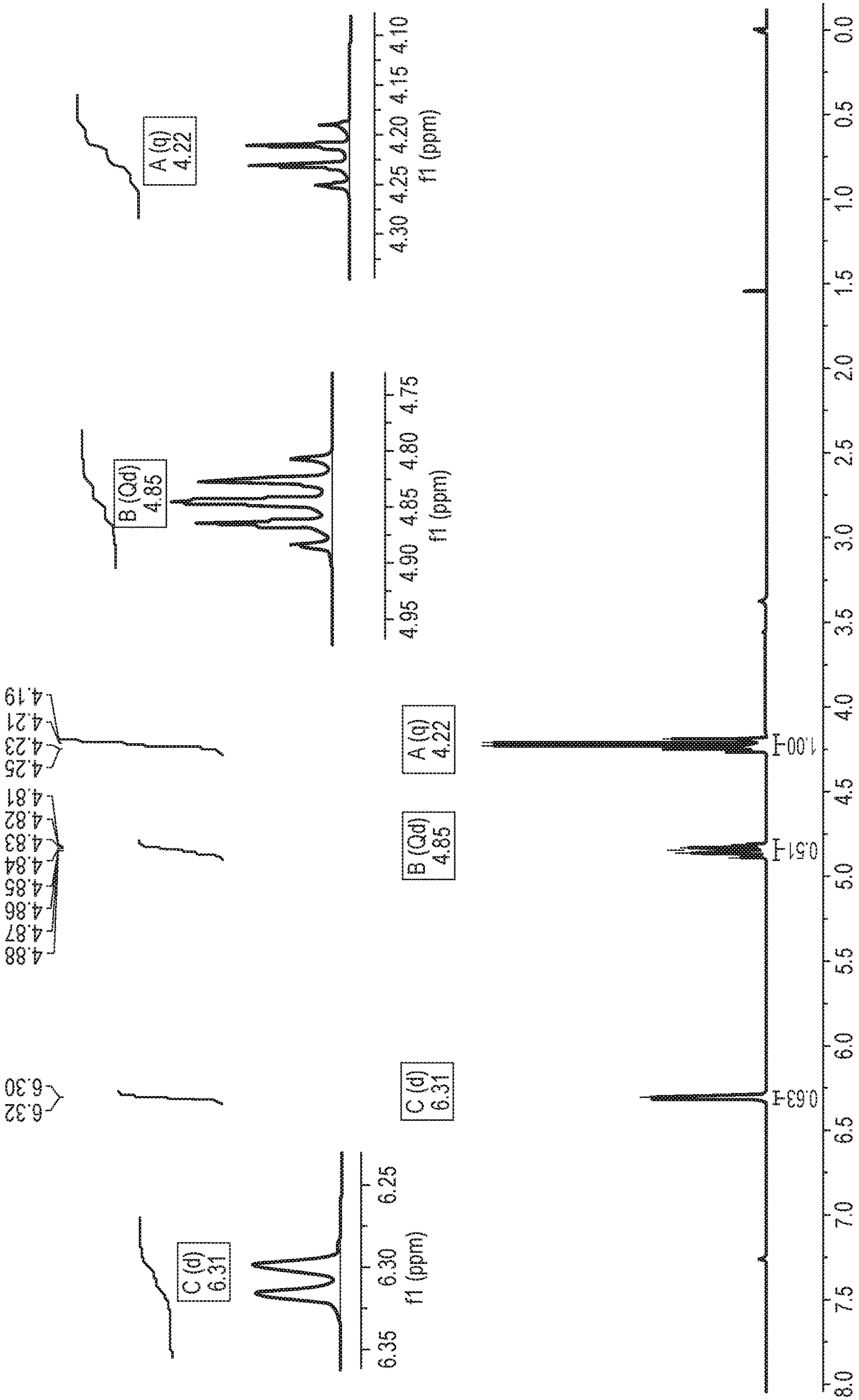
Figure 11:
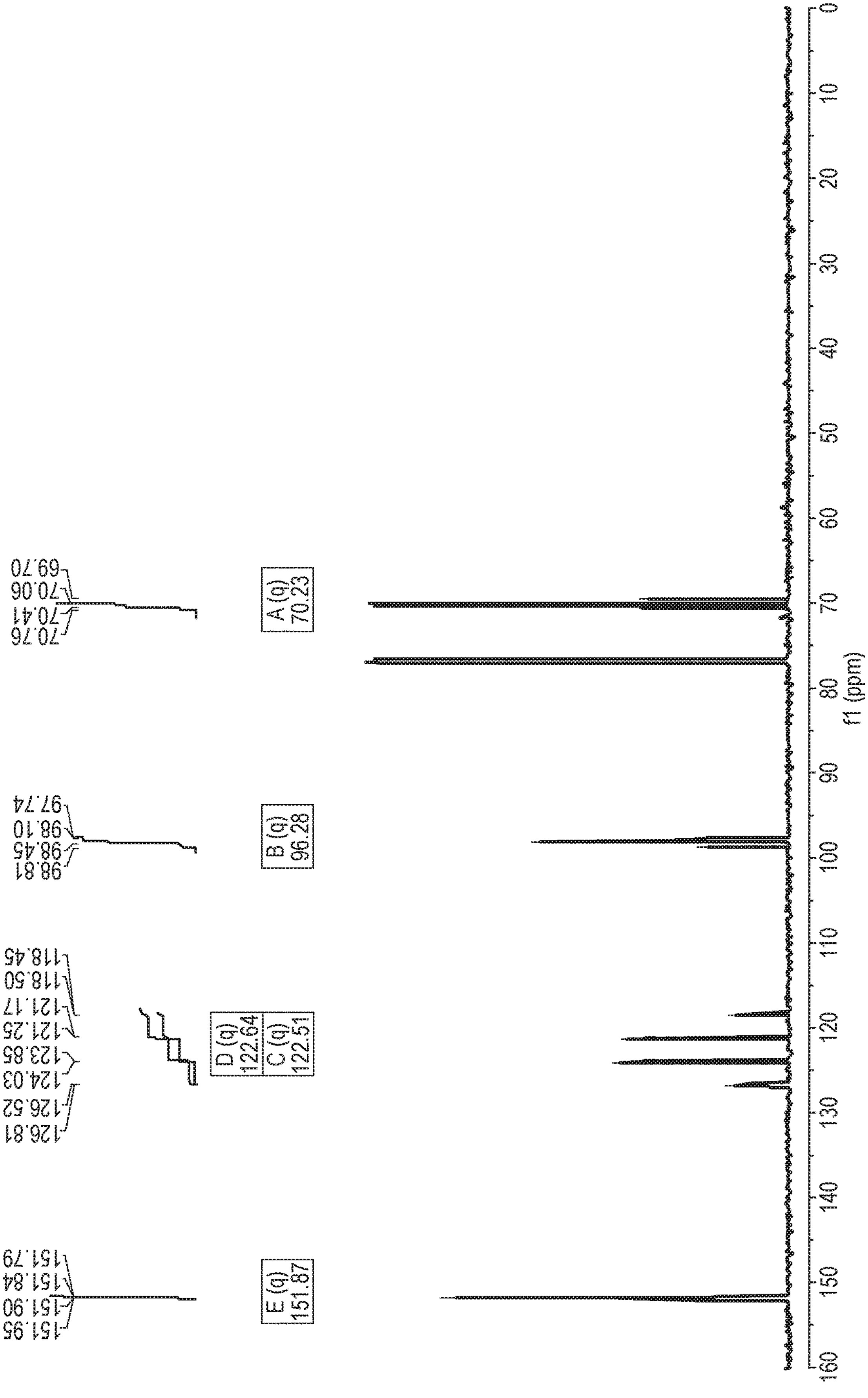

FIGS. 10 and 11 show the NMR Spectral analysis of the z-isomer of $(CF_3)(CF_3CH_2O)CCH_2$.

$^1$H NMR (400 MHz, CDCl3) 6.31 (1H, d, 3JH-H=6.9 Hz, H2), 4.85 (1H, qd, 3JH-F=8.0 Hz, 3JH-H=6.9 Hz, H1), 4.22 (2H, q, 3JH-F=8.1 Hz, H3).

$^{13}$C NMR (101 MHz, CDCl3) 151.87 (q, 3JC-F=5.5 Hz), 122.64 (q, 1JC-F=279.3 Hz), 122.51 (q, 1JC-F=269.2 Hz), 98.28 (q, 2JC-F=35.6 Hz), 70.23 (q, 2JC-F=35.8 Hz).

Figure 12A:
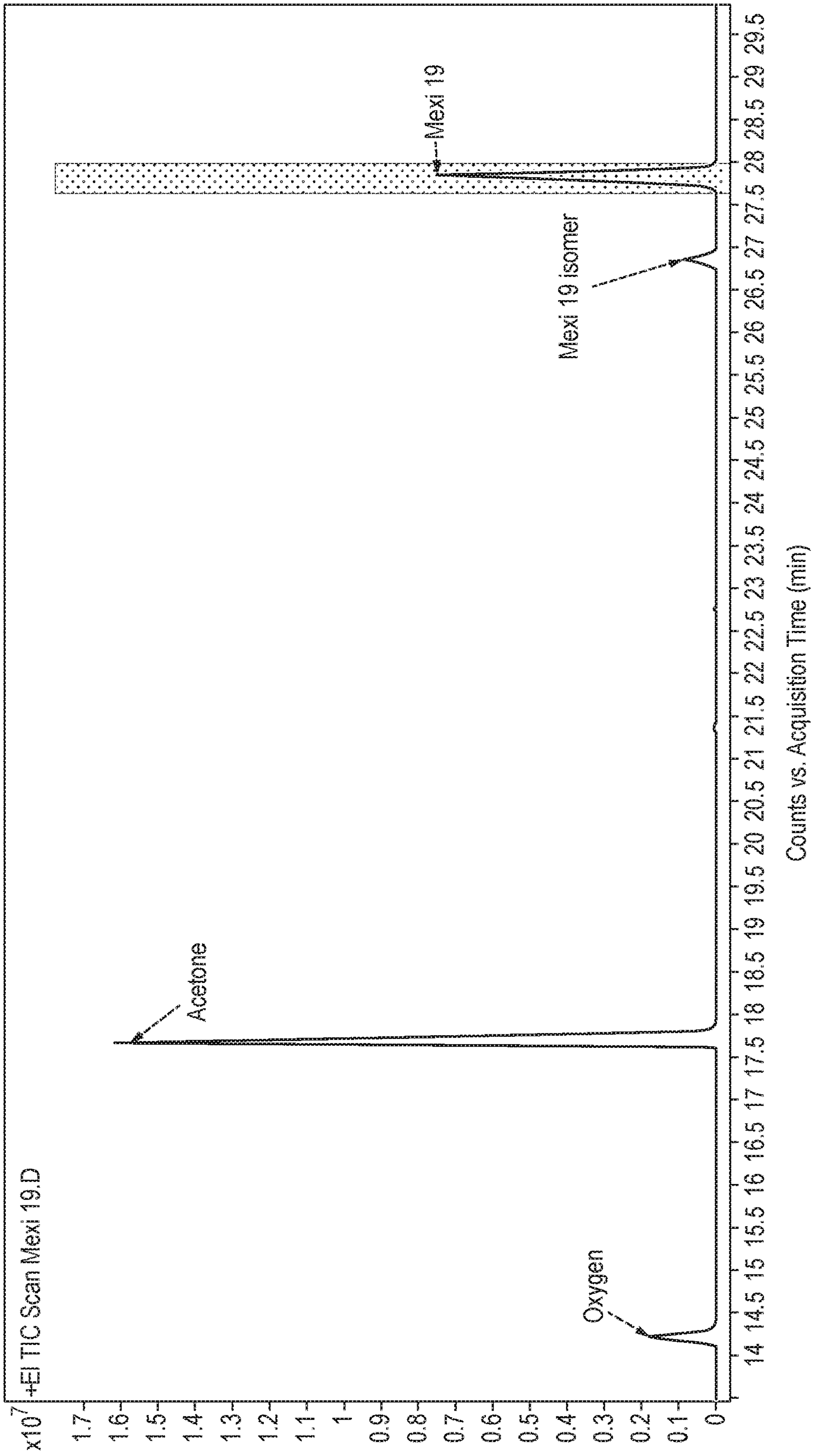
Figure 12B:
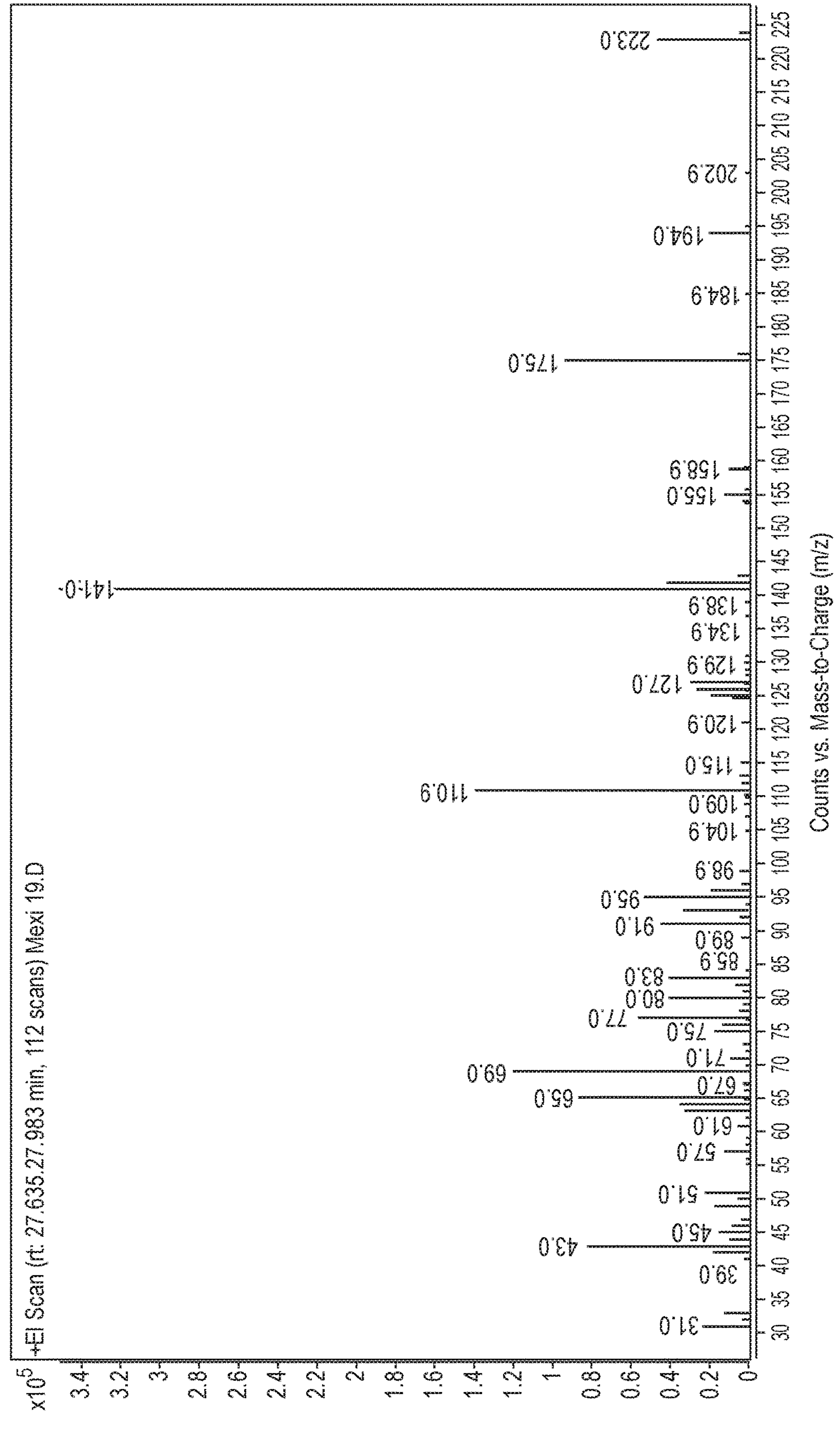

FIGS. 12*a* and 12*b* show the Gas Chromatograph and Mass Spectral analysis of Mexi-19.

Mass spectrum m/z: 223 ([M-H]$^+$), 194 ([M-$CH_2O$]$^+$), 175, 155 ([M-$CF_3$]$^+$), 141 ([M-$CH_2CF_3$]$^+$), 111, 95, 91, 83 ([$CF_3CH_2$]$^+$), 69 ([$CF_3$]$^+$), 65, 43.

Figure 13:
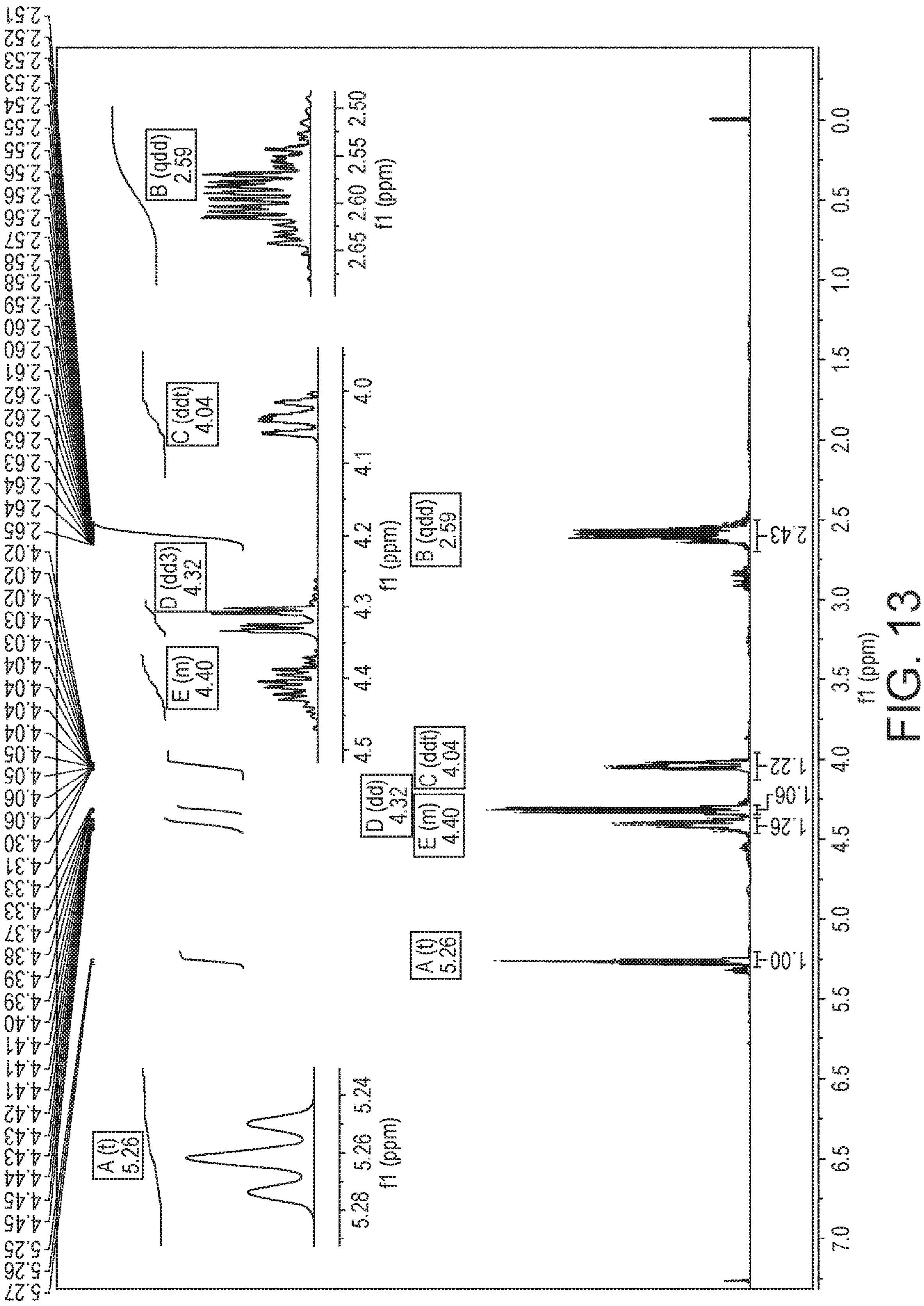
Figure 14:
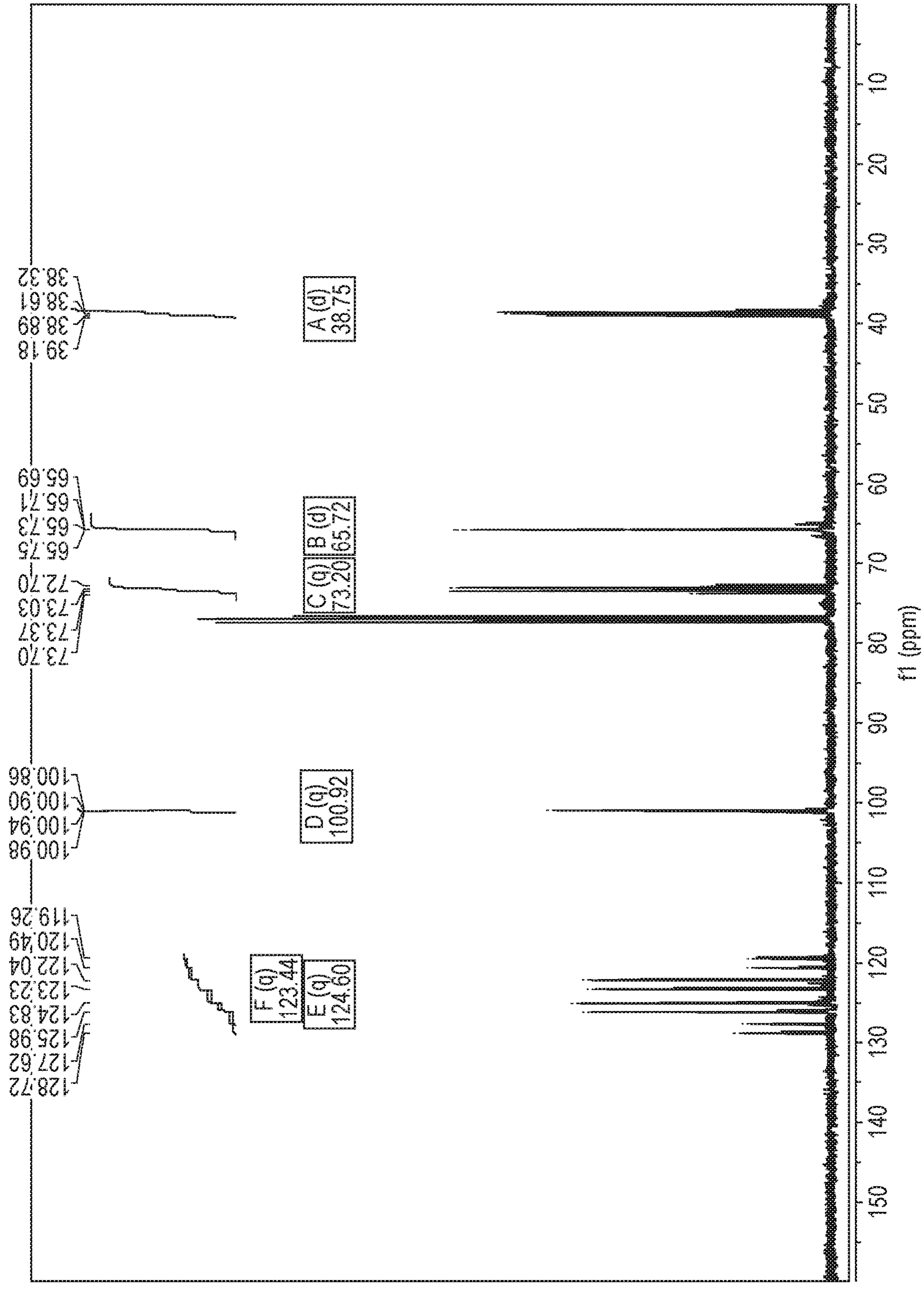

FIGS. 13 and 14 show the NMR Spectral analysis of Mexi-19.

$^1$H NMR (400 MHz, $CDCl_3$) 5.26 (1H, t, $^3J_{H-H}$=$H_4$), 4.46-4.37 (1H, m, $H_2$ or $H_3$), 4.32 (1H, dd, $^3J_{H-H}$=9.8 Hz, $^3J_{H-H}$=2.8 Hz, 1H, m, $H_2$ or $H_3$), 4.04 (1H, ddt, $^3J_{H-H}$=9.8 Hz, $^3J_{H-F}$=7.3 Hz, $^3J_{H-H}$=1.1 Hz, $H_1$), 2.59 (2H, qdd, $^3J_{H-F}$=10.7 Hz, $^3J_{H-H}$=4.9 Hz, $^3J_{H-H}$=2.8 Hz, $H_5$).

$^{13}$C NMR (101 MHz, $CDCl_3$) 124.60 (q, $^1J_{C-F}$=276.3 Hz), 123.44 (q, $^1J_{C-F}$=280.3 Hz), 100.92 (q, $^3J_{C-F}$=4.0 Hz), 73.20 (q, $^2J_{C-F}$=33.8 Hz), 65.72 (q, $^3J_{C-F}$=2.1 Hz), 38.75 (q, $^2J_{C-F}$=28.6 Hz).

The invention claimed is:

1. A nonaqueous battery electrolyte formulation comprising a compound of Formula (1) and a compound of Formula (2):

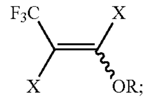

(1)

wherein R is selected from the group consisting of a $C_1$ to $C_6$ alkyl, alkenyl, or alkynyl group, optionally fully or partially substituted with F, Cl, Br, and/or I;

each X is independently selected from the group consisting of F, Cl, H, $CF_3$, and $C_1$ to $C_6$ alkyl, alkenyl, or alkynyl, which is optionally fully or partially substituted with F; and OR is cis- or trans- to any vicinal group;

wherein the compound of Formula (2) is

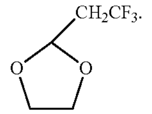

2. A battery, comprising the battery electrolyte formulation according to claim 1.

3. The formulation according to claim 1 comprising from 10 to 90 wt % of the compound of Formula (1) and 10 to 90 wt % of the compound of Formula (2).

4. The formulation according to claim 1 comprising about 50 wt % of the compound of Formula (1) and about 50 wt % of the compound of Formula (2).

5. The formulation according to claim 1 wherein the compound of Formula (1) is

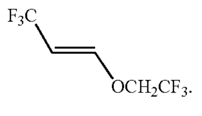

6. The formulation according to claim 1, comprising a metal electrolyte salt, present in an amount of 0.1 to 20 wt % relative to the total mass of the battery electrolyte formulation, wherein the metal electrolyte salt is a salt of lithium, sodium, magnesium, calcium, lead, zinc, or nickel.

7. The formulation according to claim 6, wherein the metal electrolyte salt is a salt of lithium selected from the group consisting of lithium hexafluorophosphate ($LiPF_4$), lithium hexafluoroarsenate monohydrate ($LiAsF_6$), lithium perchlorate ($LiClO_4$), lithium tetrafluoroborate ($LiBF_4$), lithium triflate ($LiSO_3CF_3$), lithium bis(fluorosulfonyl)imide ($Li(FSO_2)_2N$), and lithium bis(trifluoromethanesulfonyl) imide ($Li(CF_3SO_2)_2N$).

8. The formulation according to claim 7, further comprising an additional solvent in an amount of from 0.1 wt % to 99.9 wt % of a liquid component of the formulation, wherein the additional solvent is selected from the group consisting of dimethyl carbonate (DMC), ethylmethyl carbonate (EMC), fluoroethylene carbonate (FEC), propylene carbonate (PC), ethylene carbonate (EC), dimethoxyethane (DME), dioxolane (DOL), and sulfolane (SOL).

9. The formulation according to claim 1, wherein in Formula (1), R has the formula $C_{1-6}H_{0-13}Z_{0-13}$ (wherein Z is one or more of F, Cl, Br, and/or I.

10. A formulation comprising a metal ion, a compound of Formula (1), and a compound of Formula (2), optionally in combination with a solvent:

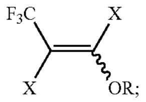

(1)

wherein R is selected from the group consisting of a $C_1$ to $C_6$ alkyl, alkenyl, or alkynyl group, optionally fully or partially substituted with F, Cl, Br, and/or I;

each X is independently selected from the group consisting of F, Cl, H, $CF_3$, and $C_1$ to $C_6$ alkyl, alkenyl, or alkynyl, which is optionally fully or partially substituted with F; and OR is cis- or trans- to any vicinal group;

wherein the compound of Formula (2) is

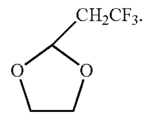

11. The formulation according to claim 10, wherein in Formula (1), R has the formula $C_{1-6}H_{0-13}Z_{0-13}$ wherein Z is one or more of F, Cl, Br, and/or I.

12. A battery comprising the formulation according to claim 10.

13. The battery according to claim 12, further comprising a lithium metal anode.

14. The battery according to claim 12, wherein the formulation further comprises a metal electrolyte salt, present in an amount of 0.1 to 20 wt % relative to the total mass of the formulation, and wherein the metal electrolyte salt is a salt of lithium, sodium, magnesium, calcium, lead, zinc, or nickel.

15. The battery according to claim 14, wherein the metal electrolyte salt is a salt of lithium selected from the group consisting of lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiSO_3CF_3$), lithium bis(fluorosulfonyl)imide ($Li(FSO_2)_2N$), and lithium bis(trifluoromethanesulfonyl)imide ($Li(CF_3SO_2)_2N$).

16. The battery according to claim 12, wherein the formulation further comprises an additional solvent in an amount of from 0.1 wt % to 99.9 wt % of a liquid component of the formulation, and wherein the additional solvent is selected from the group consisting of dimethyl carbonate (DMC), ethylmethyl carbonate (EMC), fluoroethylene carbonate (FEC), propylene carbonate (PC), ethylene carbonate, dimethoxyethane (DME), dioxolane (DOL), and sulfolane (SOL).

17. The battery according to claim 12, wherein in Formula (1), R has the formula $C_{1-6}H_{0-13}Z_{0-13}$ wherein Z is one or more of F, Cl, Br, and/or I.

18. A method of reducing the flammability of a battery and/or a battery electrolyte comprising adding to the battery and/or the battery electrolyte the battery electrolyte formulation according to claim 1, optionally in combination with a solvent.

19. A method of powering an article comprising a battery, the method comprising adding to the battery the battery electrolyte formulation according to claim 1 optionally in combination with a solvent.

20. A method of retrofitting a battery electrolyte comprising either (a) at least partially replacing the battery electrolyte with the battery electrolyte formulation according to claim 1 and/or (b) supplementing the battery electrolyte with the battery electrolyte formulation, optionally in combination with a solvent.

21. A method of preparing the battery electrolyte formulation according to claim 8 comprising mixing a compound of Formula (1) and a compound of Formula (2) with the additional solvent and with the salt of lithium so as to produce the formulation.

22. The method according to claim 19, wherein a capacity of the battery and/or charge transfer within the battery is improved relative to a battery without the formulation.

23. The method according to claim 18, wherein the formulation comprises a metal electrolyte salt, present in an amount of 0.1 to 20 wt % relative to the total mass of the nonaqueous electrolyte formulation, and wherein the metal electrolyte salt is a salt of lithium, sodium, magnesium, calcium, lead, zinc, or nickel.

24. The method according to claim 23, wherein the metal electrolyte salt is a salt of lithium selected from the group consisting of lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiSO_3CF_3$), lithium bis(fluorosulfonyl)imide ($Li(FSO_2)_2N$), and lithium bis(trifluoromethanesulfonyl)imide ($Li(CF_3SO_2)_2N$).

25. The method according to claim 18, wherein the formulation comprises an additional solvent in an amount of from 0.1 wt % to 99.9 wt % of a liquid component of the formulation, and wherein the additional solvent is selected from the group consisting of dimethyl carbonate (DMC), ethylmethylcarbonate (EMC), fluoroethylene carbonate (FEC), propylene carbonate (PC), ethylene carbonate (EC), dimethoxyethane (DME), dioxolane (DOL), and sulfolane (SOL).

26. The method according to claim 18, wherein in Formula (1), R has the formula $C_{1-6}H_{0-13}Z_{0-13}$ wherein Z is one or more of F, Cl, Br, and/or I.

27. The formulation according to claim 1, wherein the two X's in Formula (1) are not both F.

28. The formulation according to claim 10, wherein the two X's in Formula (1) are not both F.

* * * * *